Jan. 2, 1945. H. G. JOHNSTONE 2,366,193
COMPUTING SYSTEM
Filed March 15, 1930 11 Sheets-Sheet 1

Inventor
H. G. Johnstone
By J. H. B. Whitfield Att'y.

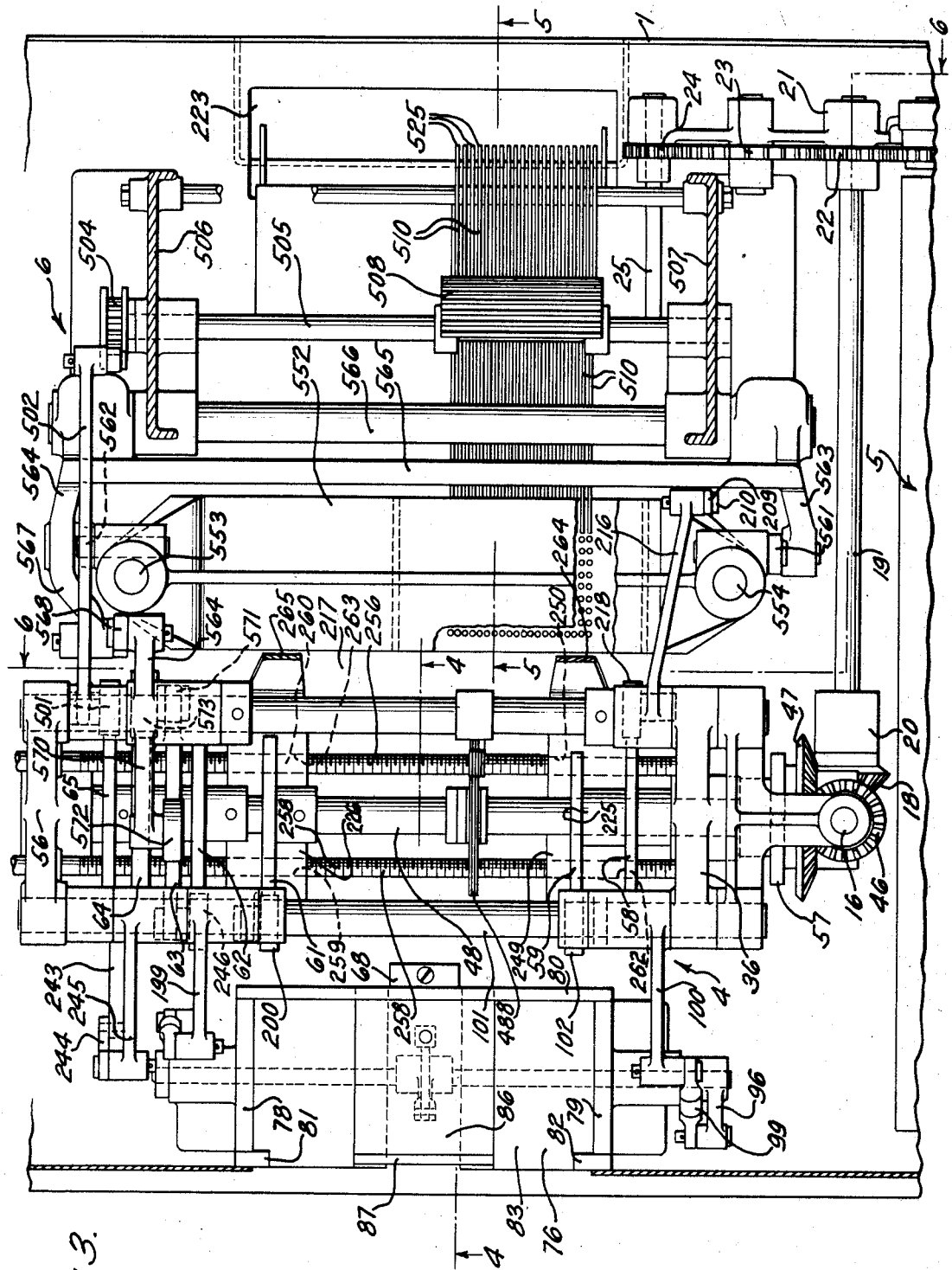

Jan. 2, 1945.  H. G. JOHNSTONE  2,366,193
COMPUTING SYSTEM
Filed March 15, 1930  11 Sheets-Sheet 3
Fig. 4.
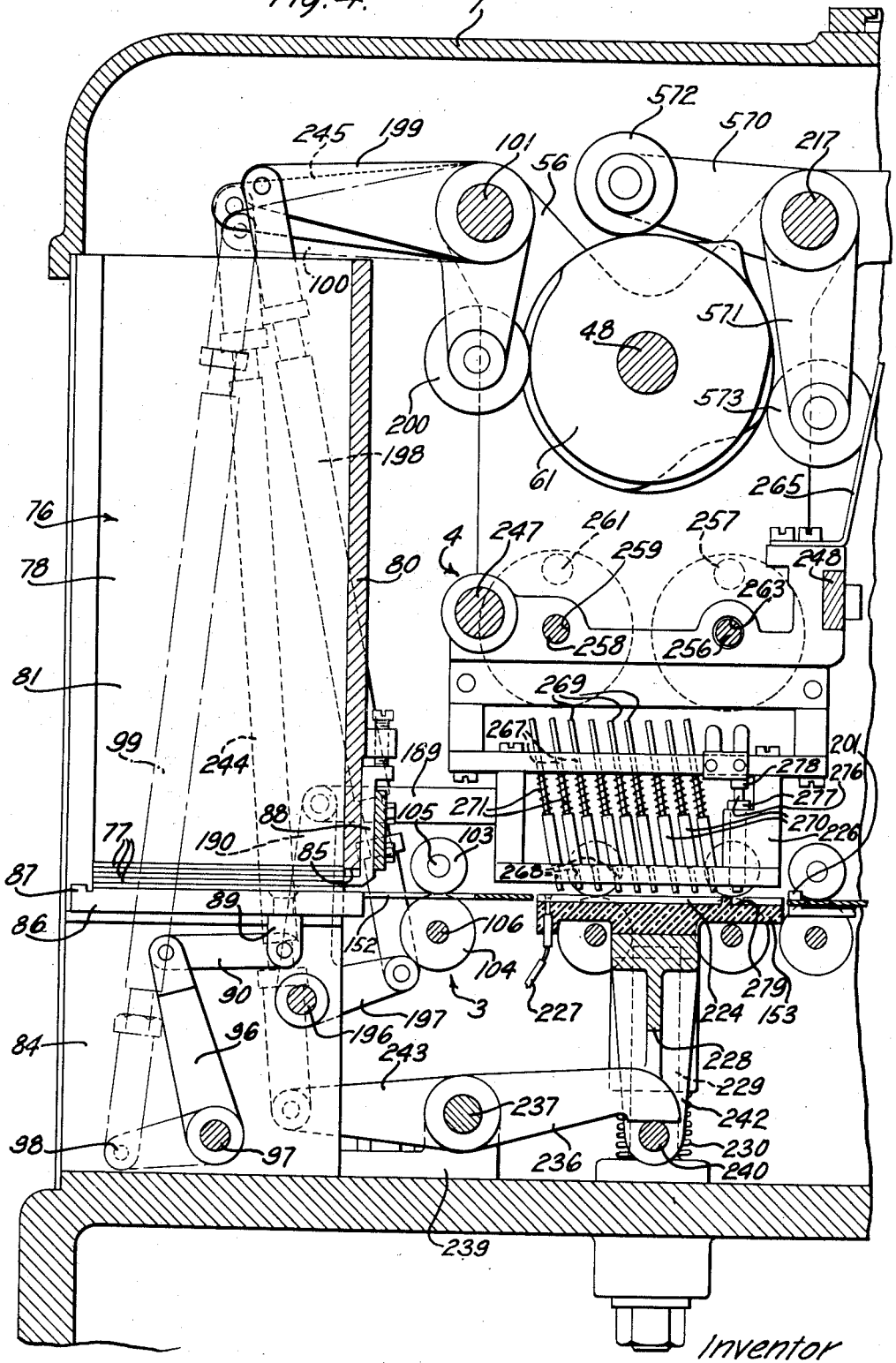
Inventor
H. G. Johnstone

Jan. 2, 1945.　　　　H. G. JOHNSTONE　　　　2,366,193
COMPUTING SYSTEM
Filed March 15, 1930　　　11 Sheets-Sheet 5

Inventor
H. G. Johnstone
By J.H.B. Whitfield Att'y.

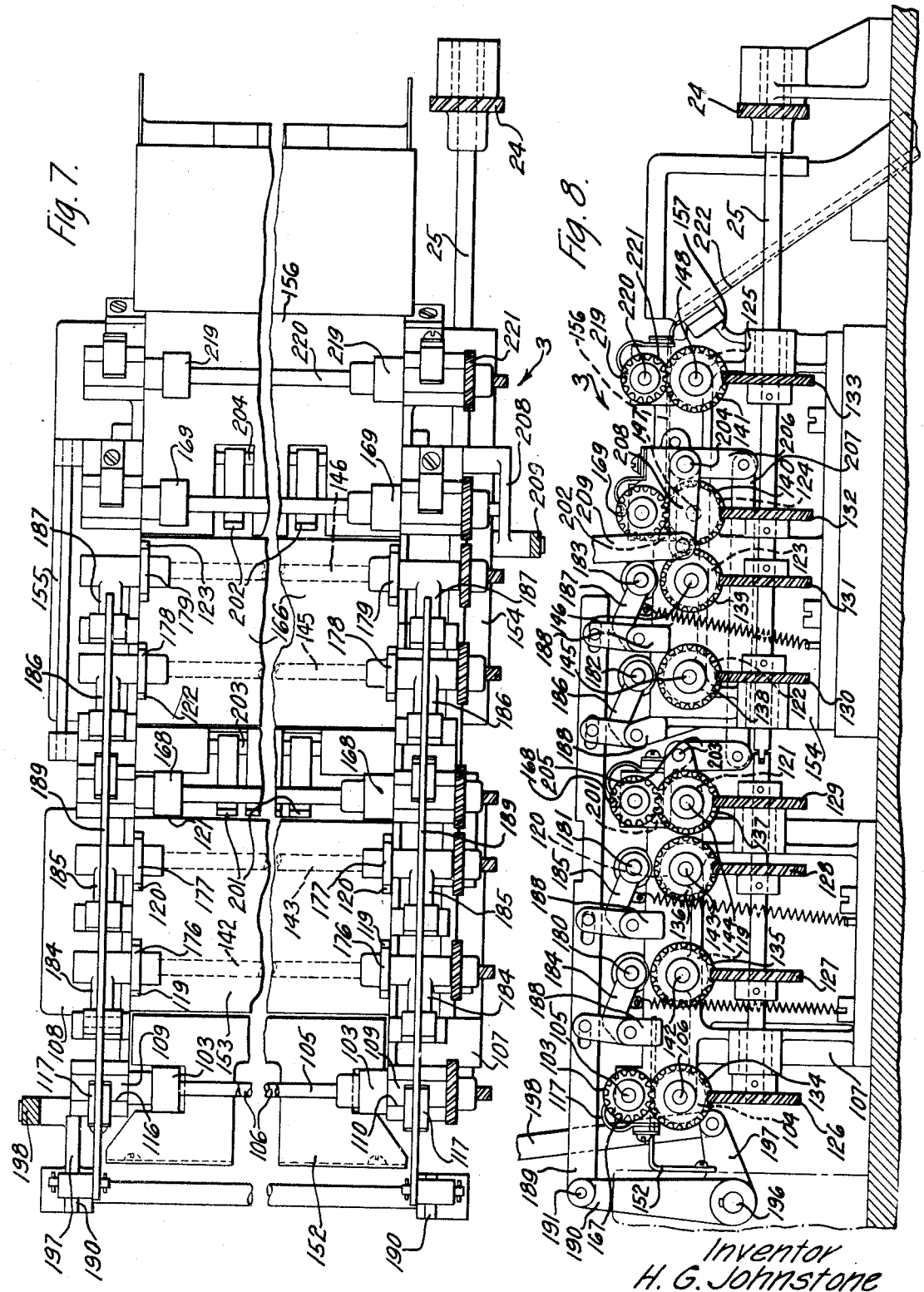

Jan. 2, 1945.  H. G. JOHNSTONE  2,366,193
COMPUTING SYSTEM
Filed March 15, 1930  11 Sheets-Sheet 7
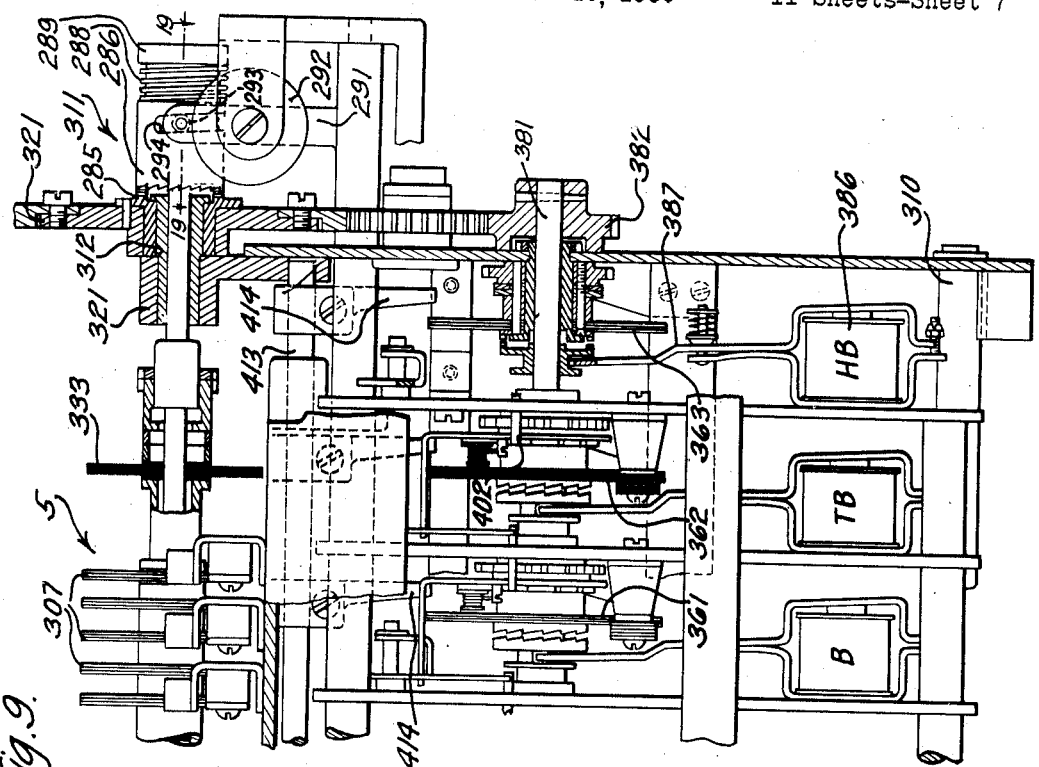
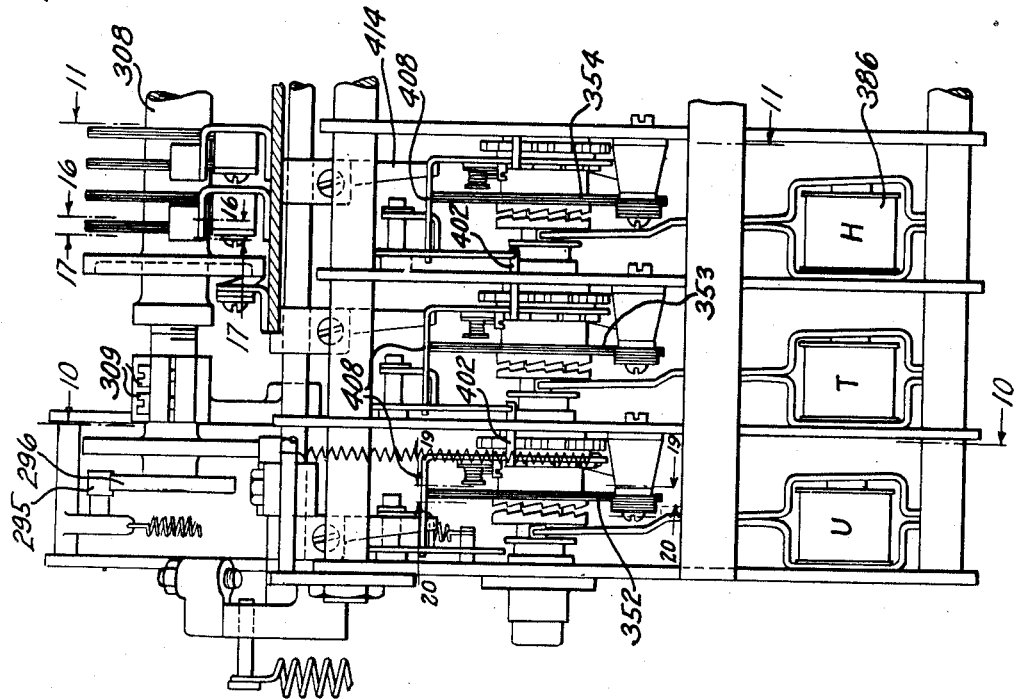
Fig. 9.
Inventor
H. G. Johnstone
By J. H. B. Whitfield Att'y.

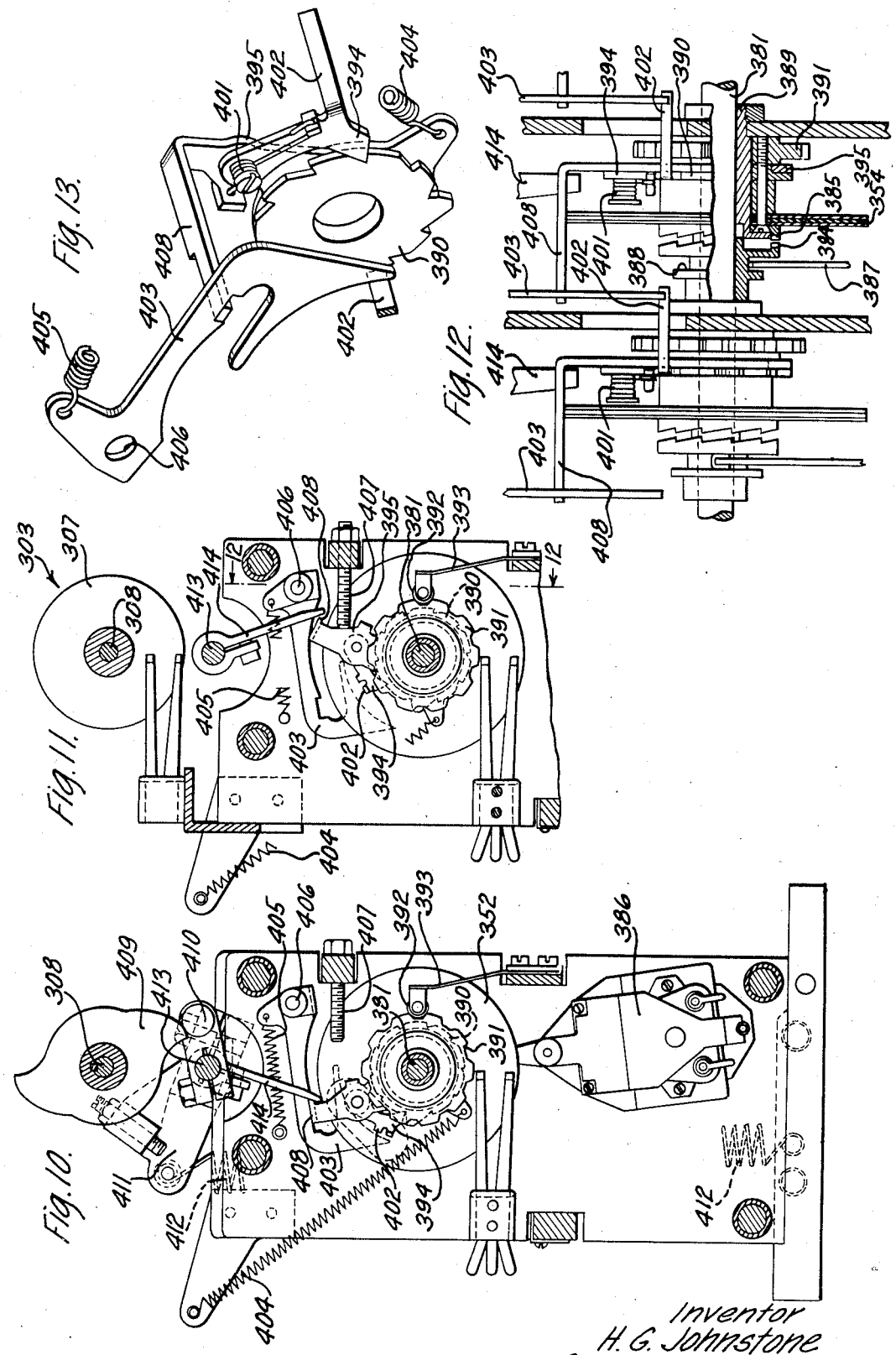

Jan. 2, 1945.  H. G. JOHNSTONE  2,366,193
COMPUTING SYSTEM
Filed March 15, 1930  11 Sheets-Sheet 9

Inventor
H. G. Johnstone
By J. H. B. Whitfield
Att'y.

Jan. 2, 1945. H. G. JOHNSTONE 2,366,193
COMPUTING SYSTEM
Filed March 15, 1930 11 Sheets-Sheet 11
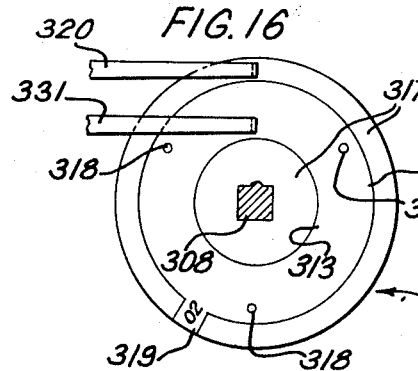
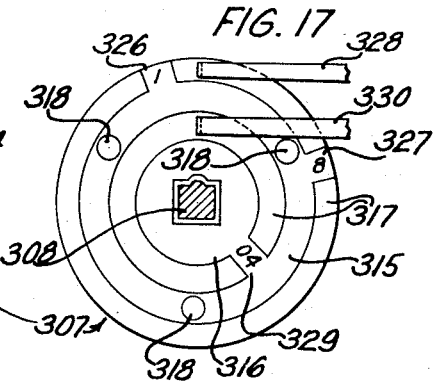
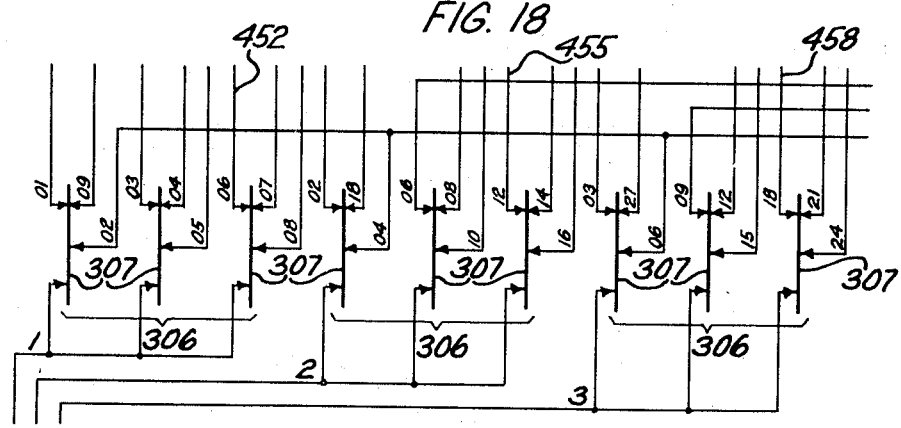
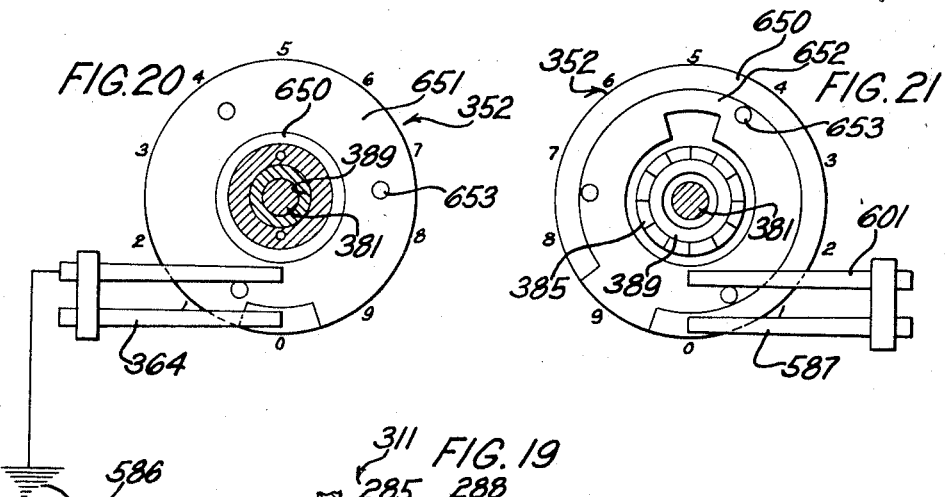
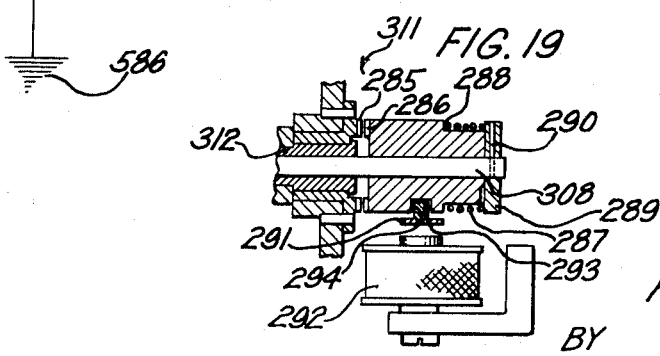
INVENTOR
H. G. JOHNSTONE
BY
ATTORNEY Patented Jan. 2, 1945

2,366,193

UNITED STATES PATENT OFFICE 2,366,193

COMPUTING SYSTEM

Harold G. Johnstone, Oak Park, Ill., assignor to Western Electric Company, Incorporated, New York, N. Y., a corporation of New York Application March 15, 1930, Serial No. 436,135

34 Claims. (Cl. 235—61.6)

This invention relates to computing systems, and more particularly to an electrically operated, mathematical multiplication system operative to perform a computation in accordance with information appearing on record sheets and record the result of such computation.

An object of the present invention is the provision of a relatively simple system for accurately and rapidly performing computations in accordance with information in a record member and recording the result of such computations.

In accordance with one embodiment, the invention contemplates a unitary system including mechanism for automatically and successively advancing perforated record sheets to a sensing head which receives information from the sheets and which transmits it to an electrical multiplying apparatus in which a computation is effected in accordance with the information recorded on each sheet. The result of the computation is then transmitted electrically for operating a perforating apparatus to record the result in terms of the allocation of perforations. Coordination of the system is made possible by the advancement of the record sheet from the sensing head to the perforating apparatus in timed relation to the actuation of the various mechanisms of the system.

These and other objects of the invention will be apparent from the following detailed description when taken in conjunction with the accompanying drawings, wherein Figs. 1 and 2 are a general plan view and a fragmentary front elevational view respectively, of the apparatus;

Fig. 3 is a fragmentary horizontal sectional view, taken substantially on the line 3—3 of Fig. 2 in the direction of the arrows;

Figs. 4, 5, and 6 are fragmentary vertical sectional views, taken on the lines 4—4, 5—5, and 6—6, respectively, of Fig. 3 in the direction of the arrows;

Figs. 7 and 8 are detailed plan and side elevational views of the record sheet advancing mechanism;

Fig. 9 is a fragmentary vertical sectional view, taken on the line 9—9 of Fig. 2 in the direction of the arrows showing the electrical multiplying mechanism;

Figure 14:
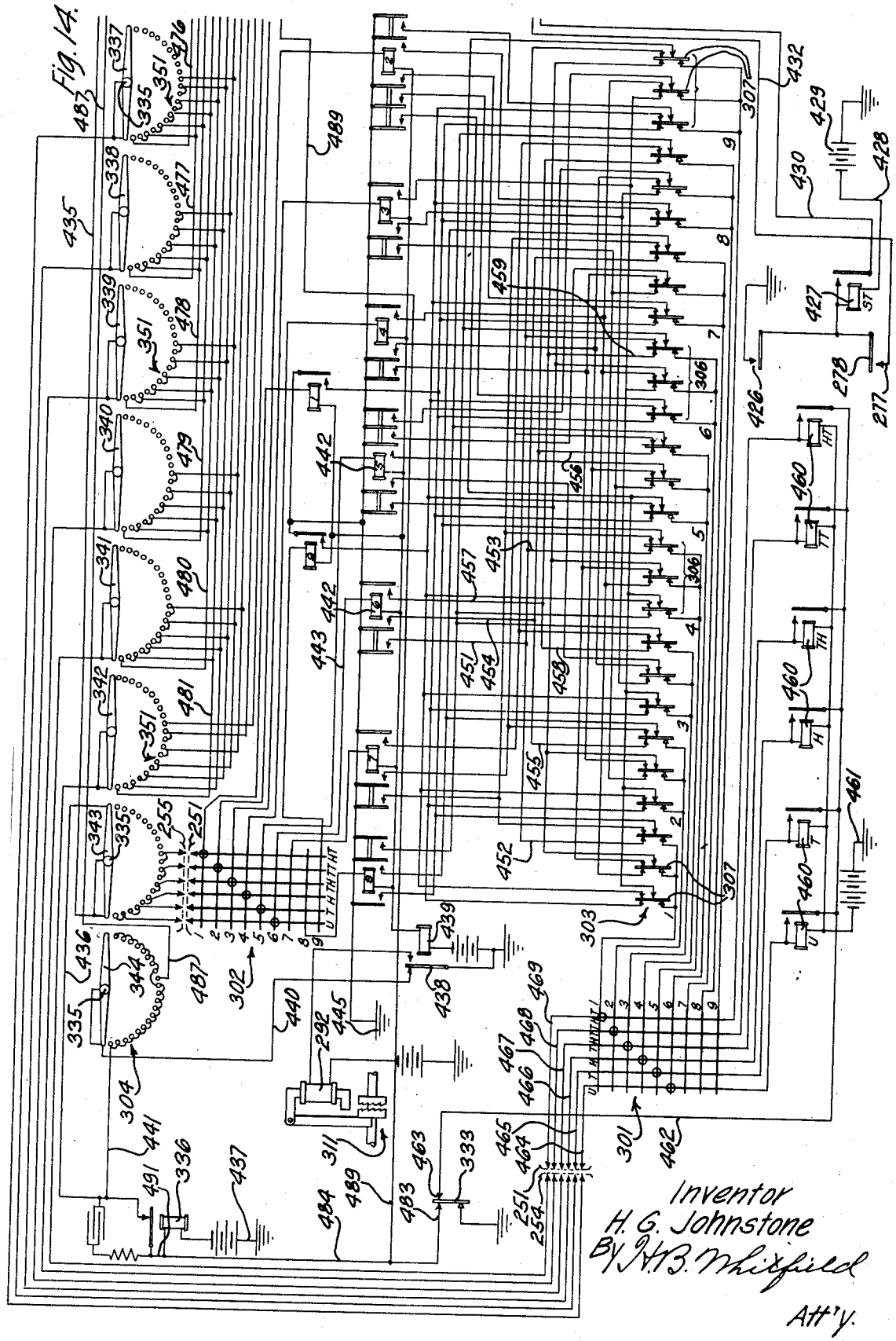
Figure 15:
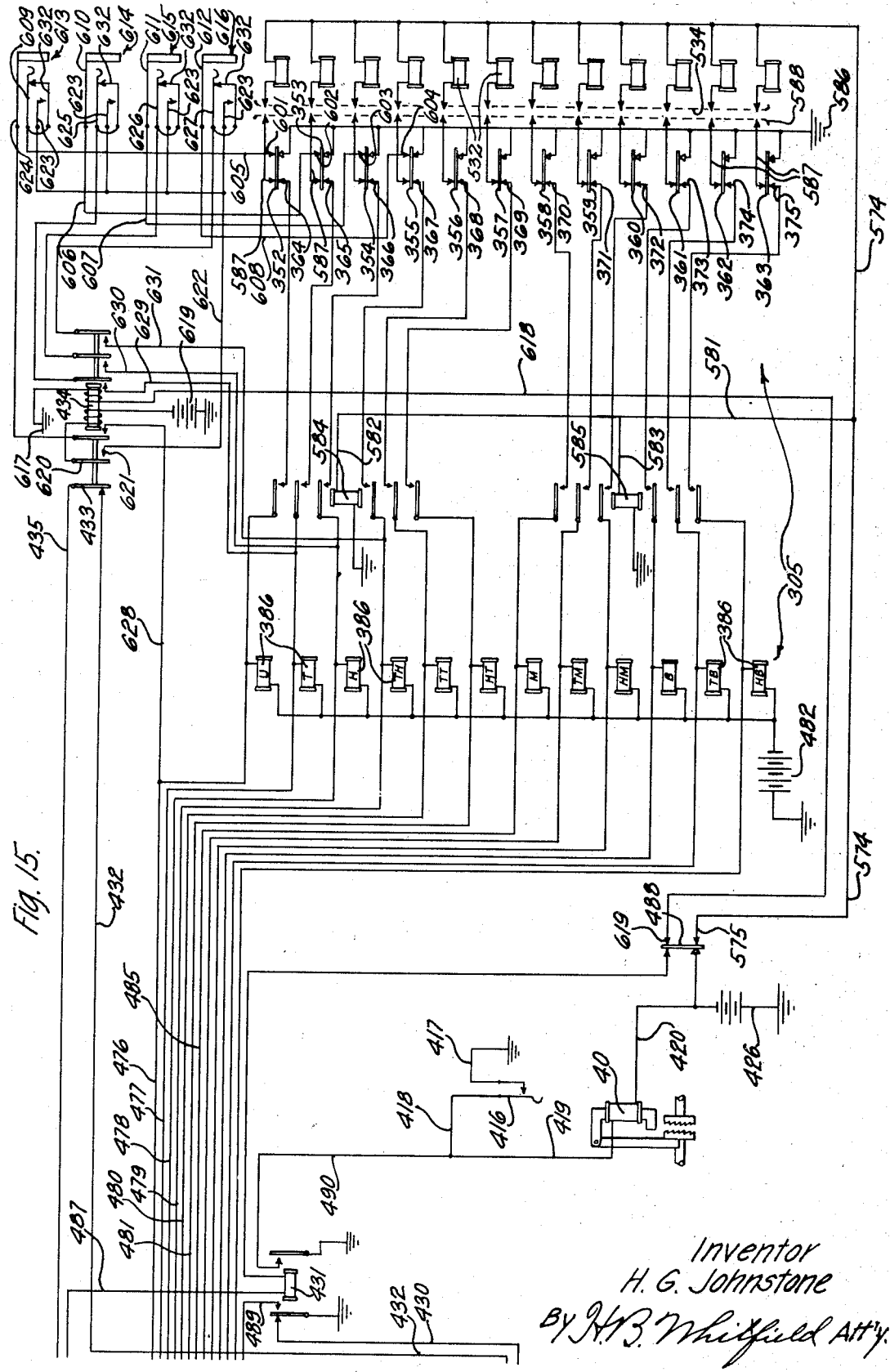

Figs. 10 and 11 are vertical sectional views taken on the lines 10—10 and 11—11 respectively, of Fig. 9 in the direction of the arrows;

Fig. 12 is a vertical sectional view, taken on the line 12—12 of Fig. 11 in the direction of the arrows;

Fig. 13 is a detailed view in perspective of a part of the electrical multiplying mechanism;

Figs. 14 and 15 are circuit diagrams which, when viewed collectively with Fig. 15 to the right of Fig. 14, disclose schematically the electrical connections of the multiplying mechanism, and the electrical control means for the system;

Figs. 16 and 17 are sectional views taken on the lines 16—16 and 17—17 respectively, of Fig. 9 in the direction of the arrows;

Fig. 18 is an enlarged fragmentary schematic of a part of the electrical multiplying mechanism;

Fig. 19 is a fragmentary sectional view taken on the line 19—19 of Fig. 9, and

Figs. 20 and 21 are fragmentary sectional views taken substantially along the lines 20—20 and 21—21 in the direction of the arrows.

Referring now to the drawings wherein like reference characters designate similar parts throughout the several views, the numeral 1 designates generally a housing, which encloses the moving parts of the mechanism, and which is mounted upon a base 2, upon and within which are positioned the principal elements of the apparatus. For the sake of simplifying the disclosure, the apparatus will be divided into four principal parts; namely, a card feeding mechanism, designated generally by the numeral 3 and shown in Figs. 4, 5, 7, and 8, a sensing mechanism designated generally by the numeral 4, and shown in detail in Figs. 3 and 4, a multiplying mechanism, designated generally by the numeral 5 and shown diagrammatically in Fig. 3 and in detail in Figs. 9 to 13 inclusive, and a card perforating mechanism, designated generally by the numeral 6 and shown in Figs. 3 and 5.

The base 2 is mounted upon suitable standards 7 (Fig. 2), and has secured to the bottom surface thereof an electrical motor 8 connected through a shaft 9 to a speed reducing mechanism 10 from which extends a shaft 16, which serves as the main drive shaft for the moving parts of the apparatus. The shaft 16 extends upwardly through the base 2 and has mounted intermediate its ends a bevel gear 17 (Fig. 6), which meshes with a bevel gear 18 mounted upon a shaft 19 which extends longitudinally of the apparatus. The shaft 19 is journaled in bearings 20 and 21 and carries, adjacent the bearing 21, a gear 22 from which the multiplying mechanism 5, to be described in detail hereinafter, is driven. The gear 22 meshes with an idler gear 23 (Fig. 3), which in turn meshes with a spur gear 24 mounted upon a shaft 25 which drives the record card advancing mechanism.

The upwardly extending portion of the shaft 16 has slidably keyed thereto a toothed clutch member 26 adapted to engage a cooperating toothed clutch member 27. The clutch member 26 is normally urged upwardly by a compression spring 28 which surrounds the shaft 16 and is positioned between the lower surface of the member 26 and the gear 17. A collar 29 formed on the clutch member 26 is engaged by a yoke 30 pivoted to a supporting member 36 at 31 and provided with a projecting portion 37 adapted to be engaged by a latch 38 formed on a spring pressed armature 39 of an electromagnet 40, which is also supported by the supporting member 36. Upon energization of the electromagnet 40 the armature 39 will be attracted to release the latch 38 from the projecting portion 37 of the yoke 30 thereby to permit the spring 28 to move the clutch member 26 into engagement with its associated clutch member 27. Clutch member 27 is freely rotatable about the shaft 16, being held against vertical movement thereon by a collar 41 pinned to the shaft 16 at 42 and a shoulder 43 formed on the shaft 16 between which and a recessed portion 44 of the clutch member 27 a washer 45 is interposed.

Formed on the clutch member 27 is a beveled gear 46 which meshes with a beveled gear 47 mounted on a cam shaft 48. The cam shaft 48 is journalled at 49 and 50 in the supporting member 36 and a supporting member 56, and carries a plurality of cam wheels 57, 58, 59, 61, 62, 63, 64, and 65, the purpose of which will be described in detail hereinafter. The cam wheel 57 constitutes a control means for resetting the latch 38 which controls the operation of the clutch member 26 and is so formed that once during each revolution of the cam shaft 48 it will actuate a cam member 66 which is slidably mounted in apertures 67 and 68 formed in brackets 69 and 70 mounted upon the supporting member 36. Upon actuation of the cam member 66 downwardly, the electromagnet 40 having been de-energized, the yoke 30 will be moved downwardly to compress the spring 28 and permit the latch 38 to engage the projecting portion 37 formed on the yoke 30 to lock the clutch member 26 out of engagement with the clutch member 27 until the electromagnet 40 is again energized. From the foregoing, it will be apparent that upon energization of the electromagnet 40 the clutch members 26 and 27 will be brought into engagement to drive the cam shaft 48 through one revolution, whereupon the clutch members will be disengaged through the actuation of the cam 57 which will restore to its normal position the armature of electromagnet 40.

A magazine designated generally by the numeral 76 (Figs. 1, 2, 3 and 4), and adapted to receive a supply of cards 77 (Fig. 4), is positioned at the front of the apparatus and comprises side walls 78 and 79, a rear wall 80, card retaining members 81 and 82, fixed to the side walls at their front ends, and a base 83. The magazine 76 is mounted upon a supporting member 84 and has a slot 85 cut in its rear wall 80, through which one of the cards 77 may be advanced by a pick-up finger 86 which has a projecting portion 87 extending above the base 83, a distance such that it will, upon being reciprocated, engage only the lowermost card. A suitable slot is provided in the base 83 in which the pick-up finger 86 may be reciprocated to advance a card through the slot 85 in the rear wall of the magazine, and a stop 88 is secured to the rear wall and is adjustable so as to permit only one card at a time to be advanced through the slot.

Secured to the underside of the pick-up finger 86 (Fig. 4) is a depending member 89 to which is pivoted a link 90, the other end of which is pivoted to an upwardly extending arm of a bell crank lever 96. The bell crank 96 is rotatable about a shaft 97 mounted in the supporting member 84, and has its horizontal arm pivoted at 98 to a link 99 which is secured at its upper end to a bell crank lever 100. The bell crank 100 carries at its lower end a cam roller 102 (Fig. 3), which engages the face of the cam 59 and is pivoted on a crank supporting rod 101 which extends between supporting members 36 and 56. Once during each revolution of the cam shaft 48, the cam 59 will, through the cam roller 102, move the bell crank lever 100 in a clockwise direction and thereafter in a counterclockwise direction (Fig. 4), to reciprocate the pick-up finger 86, thereby causing it to pick a card from the bottom of the magazine 76, and advance it through the slot 85 into engagement with a pair of cooperating upper and lower card feed rollers 103 and 104 respectively (Fig. 4).

The card feed rollers 103 and 104 are mounted upon shafts 105 and 106 (Figs. 4, 7 and 8). The shaft 106 (Figs. 7 and 8) is journalled in side plates 107 and 108 mounted upon the base 2 and the shaft 105 is journalled in journal blocks 109, which are slidable vertically in slots 110 and 116 formed in the side plates 107 and 108 respectively, the blocks being urged downwardly by springs 117.

The card feed rollers 103 and 104 are the first of a chain of card feed rollers, which serve to advance cards one at a time through the apparatus. In this series of card feed rollers, the lower rollers designated 104, 119, 120, 121, 122, 123, 124, and 125, are driven constantly from the rotating shaft 25, worm gears 126, 127, 128, 129, 130, 131, 132, and 133 being pinned to the shaft 25 and meshing with worms 134, 135, 136, 137, 138, 139, 140, and 141, mounted on shafts 106, 142, 143, 144, 145, 146, 147, and 148, respectively, which have the card rollers mounted thereon. The shafts 142, 143, and 144, are journalled in the side plates 107 and 108 and have secured thereto the card rollers 119, 120, and 121, respectively, which extend through a base plate 152 secured to the supporting member 84 (Fig. 4) and through a movable base plate 153 positioned between the side plates 107 and 108, and normally having its upper surface on the same plane as the upper surface of the base plate 152. The shafts 145, 146, 147 and 148 are journalled in side plates 154 and 155 and have mounted thereon the card feed rollers 122, 123, 124 and 125, respectively, which extend through a base plate 166 positioned between the side plates 154 and 155, and a base plate 156 supported by a bracket 157 connected to the side plates 154 and 155.

It will thus be apparent that the lower card feed rollers are all positively driven in a clockwise direction (Fig. 8), and would normally tend to advance a card which has been moved into engagement with the first set of rollers 104, but the upper cooperating card feed rollers are not all positively driven, and card stopping mechanism, to be described hereinafter, serves to interrupt the movement of a card through the apparatus. The upper card feed rollers 103 mounted upon the shaft 105 are positively driven for the shaft 105 has mounted at one end thereof, a worm gear 167 which meshes with the worm 134 being urged into engagement therewith by the springs 117.

A pair of upper card feed rollers 168 and 169 which cooperate with the lower card feed rollers 121 and 124, respectively, are constructed in the same manner as the upper card feed roller 105 and like the card feed roller 105 are positively driven in a counterclockwise direction (Fig. 8). Cooperating with the lower card feed rollers 119, 120, 122, and 123, are upper card feed rollers (Fig. 7) 176, 177, 178, and 179, respectively, rotatably mounted on the ends of stud shafts 180, 181, 182, and 183, secured to the vertically disposed arms of bell crank levers 184, 185, 186, and 187, respectively. The bell crank levers 184, 185, 186, and 187, are rotatably mounted in brackets 188 formed on the side plates 107, 108, 154, and 155, and the upwardly extending arms thereof are pinned to reciprocable connecting members 189 which have their left hand ends (Figs. 7 and 8) pinned to levers 190 at 191. The levers 190 are keyed to a shaft 196 to which is also keyed a lever 197, having connected to the end thereof a link 198 (Figs. 4, 7 and 8). The link 198 is at its upper end connected to an arm of a bell crank lever 199 mounted on the crank supporting rod 101 and carrying on its other arm a cam roller 200 which engages the surface of the cam 61 mounted on the cam shaft 48. Once in each revolution of the cam shaft 48 the cam 61 will move the bell crank 199 in a clockwise direction to impart a reciprocatory motion to the connecting member 189. Movement of the connecting member 189 will cause the bell cranks 184, 185, 186, and 187 to move the upper card feed rollers 176, 177, 178, and 179 out of engagement with their cooperating lower card feed rollers.

Simultaneously with the movement of the upper card feed rollers 176, 177, 178, and 179 out of engagement with their cooperating lower card feed rollers, stop members 201 and 202 will be moved into the path of advancing cards and will serve to position accurately the cards in the sensing mechanism 4 and the perforating mechanism 6, respectively. Movement of the card stops 201 and 202 into the path of advancing cards is effected by the following mechanism: The card stops 201 are pinned to a shaft 203, journalled in the side plates 107 and 108 and the card stops 202 are pinned to a shaft 204, journalled in the side plates 154 and 155. The shafts 203 and 204 have secured thereto depending levers 205 and 206, respectively, which are at their lower ends connected by a link 207 (Fig. 8). The shaft 204 also has keyed thereto a lever 208 at the left hand end of which is pivoted an upwardly extending link 209, whose upper end is pivoted at 210 (Fig. 3) to a horizontal extending arm of a bell crank 216 rotatable about the crank supporting shaft 217 and carrying on its vertically extending arm a cam roller 218 which engages the surface of the cam 58.

Figure 5:
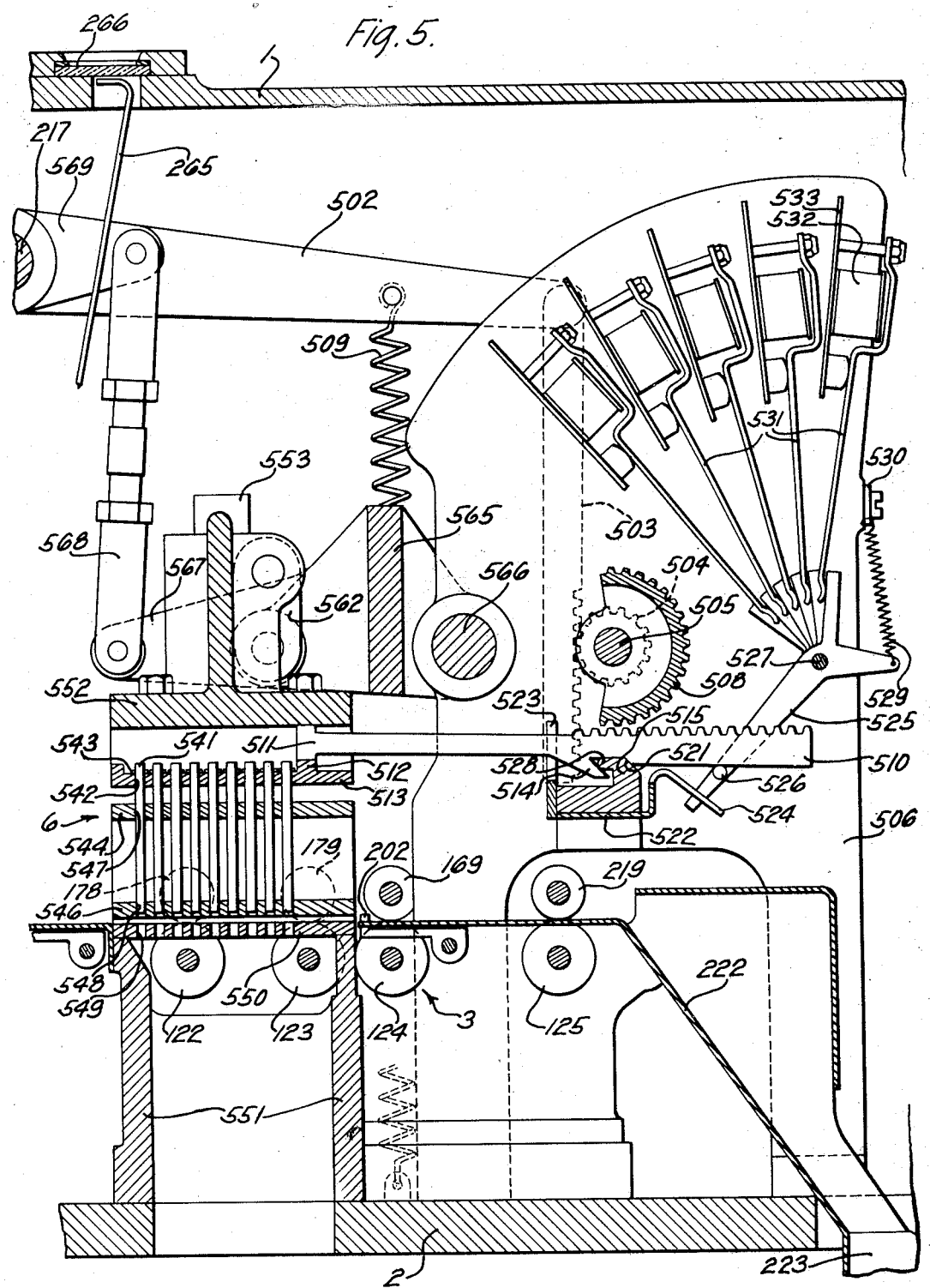

The card feeding mechanism 3, as described hereinbefore, will, upon each rotation of the cam shaft 48, move the card stops 201 and 202 out of the path of a card which will be advanced by the upper and lower card feed rollers into position in the sensing and perforating mechanisms, whereupon the card stops 201 will be moved into the path of the card being advanced from the magazine, and the card stops 202 will be moved into the path of the card being advanced from the sensing mechanism accurately to position them in the sensing and perforating mechanisms respectively, and just subsequent to the movement of the card stops into the path of the cards, the cam 61 will move the upper card feed rollers 176, 177, 178, and 179 out of engagement with the cards. It will be apparent from the foregoing that cards will be advanced from the magazine 76 step by step through the apparatus until they come into engagement with the constantly driven card feed rollers 169 and 124 which will advance them to the lower card feed roller 125 and cooperating upper card feed rollers 219 which are mounted upon a shaft 220, having worm gear 221 formed thereon which meshes with the worm gear 141. A card, upon engaging the upper card feed rollers 219 and the lower card feed rollers 125, will be directed thereby to a chute 222 which will direct them into a receiving hopper 223 (Fig. 5).

The sensing mechanism 4 to which a card is advanced from the magazine 76 and in which the card is accurately positioned by the card stops 201 comprises a pair of heads 225 and 226 (Fig. 6), the movable base plate 153, the upper portion of which is composed of an insulating composition and has embedded therein a plurality of contacting members 224 (Fig. 4) of conducting material. There are provided 45 of the contacting members 224 in the base plate 153 positioned so that one contact member will be directly under each of 45 rows of possible perforations in a record sheet of the type commonly used in tabulating machines, in which there are 45 rows in each of which rows any one of ten possible positions may be perforated. Each of the contacting members 224 is connected through a conductor 227 associated therewith, to the multiplying mechanism as described hereinafter.

The movable base plate 153 forms a part of a casting 228 which is slidable vertically on a pair of guide rods 229 secured to the base 2. Positioned around the guide rods 229 between the casting 228 and the base 2 are a pair of compression springs 230 which urge the casting to move upwardly on the guide rods 229. This movement of the casting 228 upwardly is controlled by a lever 236 which is secured to a shaft 237 journalled in brackets 238 and 239 mounted on the base 2. Secured to the other end of the shaft 237 is an arm 243 to the end of which is pivoted one end of a link 244, having its other end pivotally attached to an arm of a bell crank lever 245. The other arm of the bell crank lever 245 has mounted thereon a cam roller 246 which engages and is actuated by the cam 62. Once in each revolution of the shaft 48 the cam 62 will permit its cam roller 246 to be moved into closer association with the cam shaft 48 by the springs 230, which will thereupon move the movable base plate 153 upwardly a predetermined amount to take information from a perforated record card positioned thereon.

The 45 contacting members 224 are individually connected to 45 associated jacks 251 (Figs. 2 and 14) mounted in a switchboard 252 positioned on a base 2 at the front of the machine, any 12 of which may be connected by double ended cords 253 to jacks 254 and 255 connected to the multiplying machine mechanism as described hereinafter.

Figure 1:
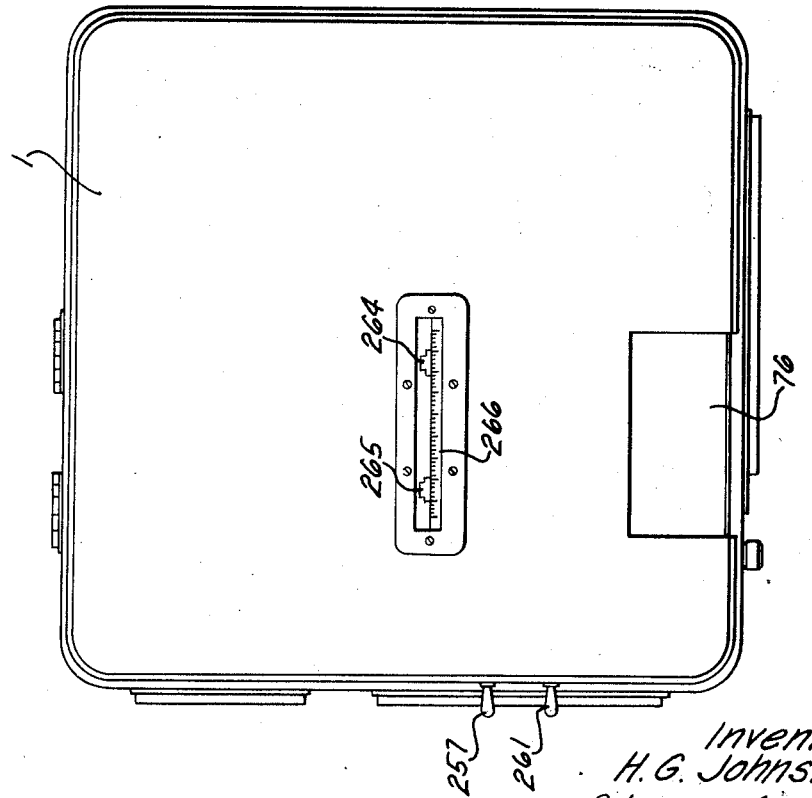

The sensing heads 225 and 226 which cooperate with the contacting members 224 to sense a card and take information therefrom, are boxlike structures (Figs. 4 and 6), which are slidable transversely of the sensing mechanism 4 on rods 247 and 248 (Figs. 3 and 4), fixed to the supporting members 36 and 56. An upwardly extending portion 249 of the sensing head 225 has a threaded aperture 250 formed therein in which is threaded a rod 256 journalled in the supporting members 36 and 56 and adapted to be rotated by means of a hand crank 257 secured thereto. In like manner a threaded rod 258 journalled in the supporting members 36 and 56 engages a threaded aperture 259 in an upwardly extending portion 260 of the sensing head 226 and may be rotated by means of a hand crank 261. The threaded rod 258 passes through an aperture 262 in the sensing head 225 and the threaded rod 256 passes through an aperture 263 in the sensing head 226. The sensing heads 225 and 226 may, by proper manipulation of the hand cranks 257 and 261, be moved either to the right or to left (Fig. 3), and their position will be indicated by pointers 264 and 265 which are attached to the sensing heads 225 and 226 respectively (Figs. 3, 4, 5, and 6), and which cooperate with an indicating scale 266 mounted on the housing 1 (Figs. 1 and 5).

The sensing head 226 has provided in its upper and lower surfaces (Fig. 4), a plurality of apertures 267 and 268 respectively, in which are slidably positioned a plurality of sensing pins 269 which have formed thereon shoulders 270 for preventing movement of the pins downwardly beyond a predetermined point, springs 271 being provided to urge the pins 169 downwardly. There are provided six rows of nine each of the pins 269, the rows being spaced apart a distance corresponding to the spacing of the contacting members 224 with which they are associated. These pins are adapted to make a sliding contact with the contacting members 224 through apertures in a card which has been advanced onto the movable base plate 153, to complete electrical circuits therethrough to the multiplying mechanism to be described hereinafter.

The sensing head 226 also carries a plunger 276 (Figs. 4 and 6), which actuates a contact spring 277 to close contact between it and an associated contact spring 278, each time the movable base plate 153 is moved upwardly while a card is positioned thereon, a slot 279 being provided in the movable base plate 153 into which the plunger 276 will pass when no card is positioned on the base plate.

The sensing head 225 is the same as the sensing head 226 except that it has no plunger similar to the plunger 276, and therefore it is not believed to be necessary to describe the sensing head 225 in detail.

The sensing heads 225 and 226, each being provided with six rows of sensing pins 269 and each being limited in movement transversely of the base plate 153 only by the other, it will be apparent that, considering the 45 contacting members 224 as being numbered 1 to 45 from right to left (Fig 6), the sensing head 226 may be associated with any six contacting members 224 from 1 to 39 and the sensing head 225 may be associated with any six contacting members 224 from 7 to 45. Each row of sensing pins 269 represents the digits 1 to 9 in a denominational column which may either be units U, tens T, hundreds H, ten hundreds TH, ten thousands TT, or hundred thousands HT, and the rows associated with the digit 1, 2, 3, 4, etc., are connected to common conductors; that is, the sensing pins 269 representing the digits 1 in all of the denominational columns are connected to a common conductor, the pins representing the digits 2 in all of the denominational columns are connected to a second common conductor, etc., through the digits 9.

Referring now to Figs. 14 and 15, the group of coordinated lines designated 301 represents schematically the sensing head 225 and any six contacting members 224 with which the sensing head may be associated and for the sake of simplicity, will be termed the multiplicand bank 301, since it will be assumed that the contacting members 224 associated with the sensing head 225 have been connected through their associated jacks 280, and the double ended cords 281 to the jacks 282 which are connected to the multiplicand part of the multiplying mechanism. In like manner the group of lines designated 302 represent schematically the sensing head 225 and any six contacting members 224 with which it may be associated, this group of lines being hereinafter termed the multiplier bank.

In the multiplier bank 302 the vertical lines or columns from left to right denote units U, tens T, hundreds H, ten hundreds TH, ten thousands TT, and hundred thousands HT, and the nine rows of horizontal lines designate the digits 1 to 9 consecutively, from top to bottom. Each intersection of the lines represents an electrical contact in the sensing head 225 or 226 which is normally open, but which will be closed if the sensing pins 269 associated with that particular digit registers with an aperture in the position allocated thereto on the record card and engages the contacting members 224 associated therewith.

Any particular problem of multiplication can be transmitted to the multiplying mechanism 5 by the closure of contacts at the points corresponding to the digits in the multiplicand and multiplier as indicated in the multiplier and multiplicand banks 302 and 301. The closure of these contacts completes electrical circuits through a multiplying commutator 303 and sends electrical currents to a distributor switch denoted generally by the numeral 304, which directs the currents to an accumulator 305 for accumulating the results of the computation effected for transference to the perforating mechanism 6.

The multiplying commutator 303 (Figs. 9, 14, 16, 17 and 18), comprises an electrical multiplication table in which there are nine sets, designated 306, of nine each of electrical contact disks insulated from each other and divided into twenty-seven units of three each, designated by the numeral 307, so adapted that each contact represents one of a series of numbers representing the product of each digit times itself and each other digit running from 01 to 81. Each of the nine sets 306 of nine contact disks represents the numbers 1 to 9 consecutively and is connected to individual brushes leading to the corresponding digit in the multiplicand bank 301. The contact disks 307 are insulated from and secured to a rotatable shaft 308 journalled in a bearing 309 fastened to a frame 310 (Fig. 9), and a constantly driven hollow shaft 312 having a gear 321 secured thereto for driving the hollow shaft which is in turn journalled in a bearing 321.

A magnetic clutch 311 is provided for connecting the shaft 308 to the constantly driven hollow shaft 312 to impart rotative motion thereto. The clutch 311 comprises a toothed member 285 secured to the hollow shaft 312 and a toothed member 286 slidably keyed to the shaft 308 and urged into engagement with the toothed member 285 by a spring 287 which engages a shoulder 288 on the toothed member 286 and a collar 289 pinned to the shaft 308 at 290. An armature 291 of an electromagnet 292 mounted on the frame 310 normally holds a pin 293 in a slot 294 formed in the periphery of the toothed member 286. The slot 294 is curved in such a manner that the pin 293 upon engaging it will move the toothed member 286 out of engagement with the toothed member 285. As the pin 293 effects the disengagement of the toothed members 285 and 286 a spring pressed cam roller 295 engages a center stop cam 296 on the commutator shaft 308 to accurately position it. The circuit controlling the clutch 311 and the means for driving the gear 321 will be described in detail hereinafter.

Each unit 307 of three contact disks is also provided with an associated feed disk 313 (Fig. 16), for making connections with the digit horizontal lines in the multiplicand bank 301. The contact disks have individual brushes and are so constructed that the position of a contact on half of the circumference represents the unit number of the particular product of two digits and the contact on the other part represents the tens part.

Figs. 16 and 17 show one of the units 307 of three disks 314, 315 and 316, representing the products of multiplying 2 by 1, 9 and 2 respectively. These disk units 307 are similar in construction to sequence switches commonly used in telephone exchange systems. The three copper disks 314, 315 and 316 are mounted on an insulator 317 and are electrically interconnected due to the fact that the disks 315 and 316 are integral and are connected with the disk 314 by means of copper rivets 318, passing through the insulator and serving to hold the elements together as the unit 307. The insulator 317 is keyed to the commutator shaft 308 and insulates the associated copper disks therefrom. Disk 314 has one radial contact 319 representing the product 02 of 2×1 to be engaged by a brush 320 (Fig. 16) at a predetermined point in the rotation of the unit 307; the disk 315 has two radial contacts 326 and 327 representing the tens digit 1 and the units digit 8 of 2×9 to be engaged by a brush 328 and the disk 316 has a contact 329 representing the product 04 of 2×2 to be engaged by a brush 330. A feed brush 331 contacts continuously (a triangular headed arrow (Fig. 14) designates a brush which is always in contact) with the feed disk 313 which is shown in Fig. 16 as being integral with disk 314. The brushes as shown in Fig. 14 are connected through conductors to the multiplicand and multiplier banks 301 and 302. The above described unit was selected for purposes of illustration, and it will be understood that the other units are of a similar construction and are analogous to sequence switches used in telephone systems.

Fig. 18 the enlarged fragmentary schematic of the multiplying commutator, shows the arrangement of the multiplication table for three of the sets 306 representing the digits 1, 2 and 3. The The multiplication table as illustrated follows the series of 1×1, 1×9, 1×2, 1×3, 1×4, 1×5, 1×6, 1×7, and 1×8; 2×1, 2×9, 2×2, 2×3, 2×4, 2×5, 2×6, 2×7, and 2×8; 3×1, 3×9, 3×2, etc., wherein each of the contacts represents a particular product. The multiplication table follows the usual order except that the digit 9 is placed between digits 1 and 2 to simplify the interconnecting of the circuits. It will be clear that the multiplication tables for the numbers 4 to 9 inclusive are followed in a similar manner throughout the length of the multiplying commutator.

Secured to the multiplying commutator shaft, but electrically insulated therefrom, is a control commutator 333, the purpose of which will be clearly understood as the description progresses.

The distributor switch 304 (Fig. 14) is provided for transferring the electrical connections from units to tens, tens to hundreds, hundreds to ten hundreds, etc., as the multiplication progresses to complete an electrical circuit to the proper electromagnets in the accumulator or register 305. The distributor switch is similar in design to selector switches used in telephone systems and comprises in general a shaft 335, an electromagnet 336 for rotating it one step at a time, eight brushes 337 to 344 inclusive insulatively mounted upon the shaft, and arcuate banks 351 of twenty-two stationary contacts each adapted for cooperation with said brushes. Six of the brushes 337 to 342 inclusive designate and are connected by conductors to the units U, tens T, hundreds H, ten hundreds TH, ten thousands TT, and hundred thousands HT, columns in the multiplicand bank 301. The seventh brush 343 applies ground, progressively to one of the columns indicating units U, tens T, hundreds H, ten hundreds TH, ten thousands TT, and hundred thousands HT, in the multiplier bank 302 as the multiplication advances to close the circuit therefrom through the multiplying commutator 303, multiplicand bank 301, distributor switch 304 and and the accumulator 305 to battery and ground. The purpose of the eighth brush 344 will become apparent as the description progresses. The distributor switches are mounted in the base 2 as are all of the relays forming a part of the multiplying mechanism.

The accumulator 305 registers the products of the multiplication and comprises in this embodiment of the invention 12 individually rotatable contact disks 352 to 363 inclusive, representing units U to hundred billions HB in the final product respectively, with which are associated stationary brushes 364 to 375 inclusive adapted to make a wiping engagement with the contact disks. The position of a brush on a rotated contact disk will indicate the amount of rotation of the disk, and it will be readily understood that the value of the digit registered on the contact disk will be proportional to the amount the disk has been rotated.

The rotation of the accumulator contact disks 352 to 363 inclusive is accomplished by an electromagnetically operated means which will now be described: Referring to Figs. 2 and 9 to 13 inclusive of the drawings, a shaft 381 suitably journalled in the frame work 310 has a gear 382 secured thereto meshing with an idler gear 383, which in turn meshes with and drives the gear 321 associated with the commutator shaft 308. The gear 382 meshes with and is driven by an idler gear 396 (Fig. 6) which meshes with the gear 22. Slidably keyed to and rotatable with the shaft 381 is a clutch member 384 (Fig. 12) having a serrated face adapted to engage an associated serrated face on a clutch member 385 upon energization of an electromagnet 386 individual thereto, mounted on the framework 310, and having an armature 387 bifurcated to engage the surface of an annular depression 388 on the clutch member 384. The clutch member 385 is secured to a sleeve 389 freely rotatable upon the shaft 381 which sleeve also has secured thereto one of the contact disks 352 to 363, a ratchet 390 and a center stop 391. Associated with the center stop 391 is a roller 392 mounted upon a spring 393 attached to the framework 310 which serves to position the disk accurately in the center of a position when the operation of the disk ceases. The ratchet 390 has one tooth thereof considerably higher than the others which higher tooth, upon engaging a pawl 394 associated with the ratchet and mounted upon a disk 395 freely mounted on the sleeve 389, moves the pawl higher than the other teeth move it. The pawl is urged into engagement with the teeth of the ratchet 390 by a coil spring 401 and has formed integral therewith an arm 402 which extends through the framework 310 and engages a surface of a latch 403 associated with one of the contact disks 352 to 363 (Fig. 9) representing the next higher denominational digit in the product. A contractile spring 404 urges the disk 395 supporting the pawl to rotate about the sleeve 389 in a clockwise direction (Figs. 10 and 11) and a spring 405 urges the latch 403 to rotate about its pivot 406 in a counterclockwise direction into engagement with the pawl, the disk 395 being prevented from rotating beyond a predetermined point by an adjustable stop member 407 mounted on the framework 310. Formed integral with the disk 395 is an arm 408 which is engaged by the latch 403 and normally prevents the spring 404 from rotating the disk 395 about the sleeve 389. However, when the pawl 394 engages the high tooth on the ratchet 390, which will occur as the contact disk with which the ratchet is associated passes from the position where it registers the digit 9 to the position where it registers the digit 0, the latch 403 will be moved upwardly releasing the arm 408 and permitting the spring 404 to move the pawl carrying disk 395 in a clockwise direction a distance equal to the amount of rotation necessary to add the digit 1 to the contact disk.

Fixed to the shaft 308 is a cam 409 which engages a camming pin 410 mounted on one end of a lever 411, the other end of which has a spring 412 secured thereto which tends to rotate the lever 411 and a shaft 413 upon which the lever is mounted in a counterclockwise direction (Fig. 10). This shaft has secured thereto a plurality of levers 414 which, at a predetermined point in each half revolution of the shaft 308, are moved into engagement with the arms 408 associated with the contact disks 352 to 363 and any of these arms which have been released by their associated latches 403 under actuation of the pawl 394 associated with the contact disk of the next lower denomination, are moved in a counterclockwise direction to advance the associated contact disk a distance representing the value of the unit 1.

In order to facilitate an understanding of the working relationship of the details of the computing mechanism and to afford a more effective means of describing many important functions thereof, an explanation will be given of the steps performed in a specific example such as multiplying 1234.56 by 1234.56.

Let it be assumed that the supply of cards 77 are positioned in the magazine 76, the lowermost or bottom card having punched therein in the columns thereof allotted to the multiplicand the the number 1234.56 and in the columns allotted to the multiplier the number 1234.56. A manually operable start key 416 (Figs. 2 and 15) may be operated momentarily to connect ground at 417 through conductors 418 and 419, the windings of the electromagnet 40 and a conductor 420 to grounded battery at 426. The momentary closure of the contacts of the starting key 416 will thus energize the electromagnet 40 to connect the clutch members 26 and 27 to drive the cam shaft 48 through one complete revolution.

Figure 6:
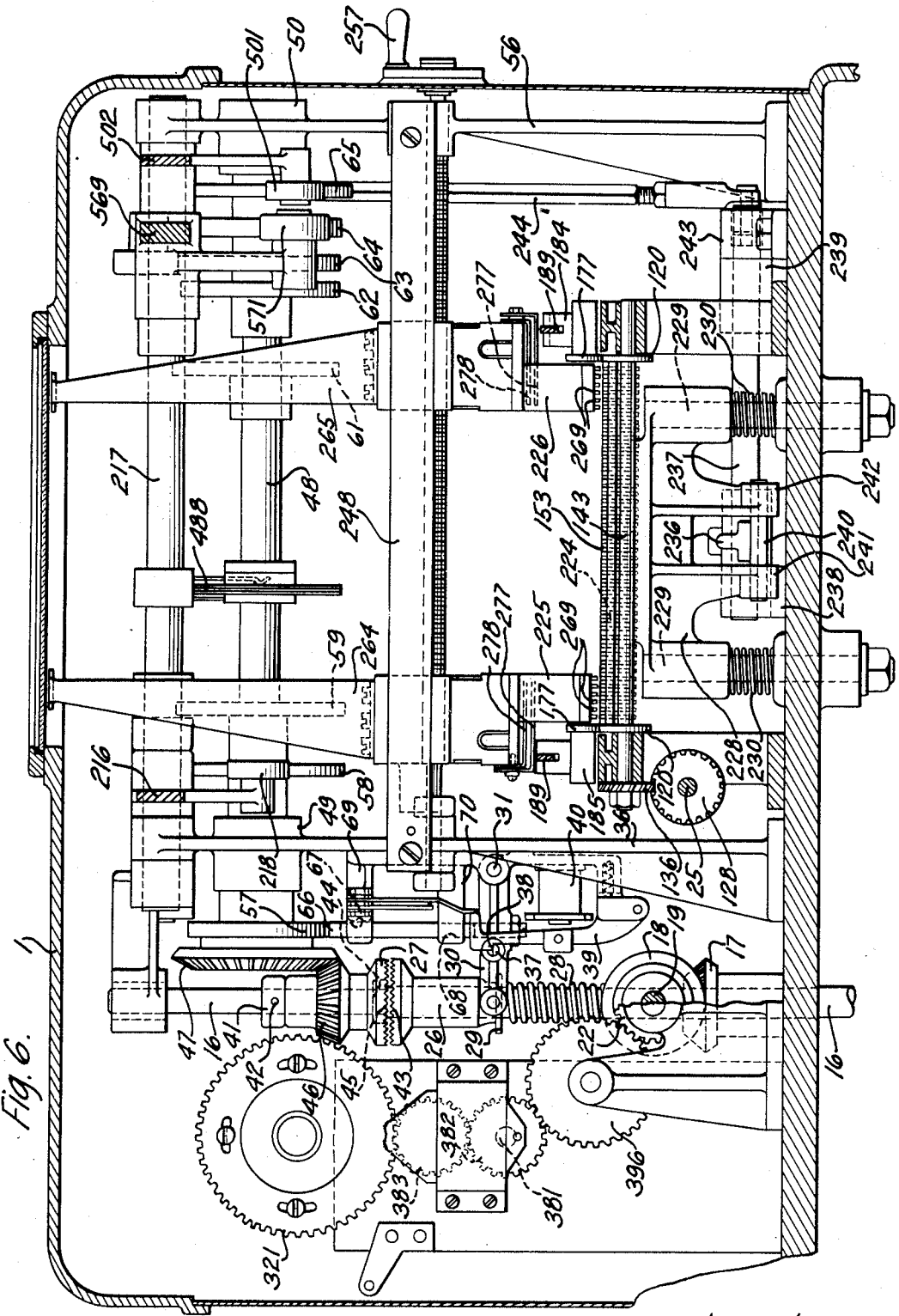

In rotating through one complete revolution the cams mounted upon the cam shaft will cause the operation of the card feeding mechanism to select the bottom card from the magazine 76, advance it to the movable base plate 153, move the base plate first downwardly and then upwardly to make the contacts indicated by the circles on the multiplier and multiplicand banks 302 and 301 respectively (Fig. 14). The base plate 153 in moving downwardly closes a contact 426' (Fig. 14), to complete a circuit from ground through the windings of a starting relay 427, a conductor 428 to grounded battery at 429, and in moving upwardly with a card thereon, moves the contact spring 277 into engagement with the contact spring 278 (Figs. 6 and 14). The relay 427, upon being energized, establishes a locking circuit for itself from grounded battery 429 through its windings, contact, and armature, conductor 430 to the left hand contact of a release relay 431 to ground. The engagement of the contact spring 278 with contact 277 (Fig. 14), completes a circuit from ground through the left hand contact of the relay 431, conductor 430, the contact of the starting relay 427, contacts 277 and 278, a conductor 432, a back contact 433 of a relay 434, conductor 435, brush 343, contact 22, on the bank associated with the brush 343, conductor 436, armature of the magnet 336 to grounded battery at 437. This completes a circuit through the distributor switch magnet 336 energizing it so that it will break the contact between the armature thereof and the conductor 436 operating the switch 304 to move all of the brushes 337 to 344 inclusive into engagement with the first contact of their associated banks.

The brush 344 in engaging terminal 1 of its associated bank connects ground through a contact 438 of a relay 439, a conductor 440 through the brush and a conductor 441, contact of the electromagnet 336, winding of the magnet 336 to grounded battery at 437. Simultaneously with the completion of this circuit to magnet 336, the brush 343 will complete a circuit from grounded battery through the relay 439, a relay 442 connected to the horizontal line representing the digit 6 in the multiplier bank 302 by a conductor 443, through the closed contact 6 in the units column of the multiplier bank through a terminal of the arcuate bank of contacts associated with the brush 343, this brush having been stepped onto said contact simultaneously with the movement of the brush 344, through the brush 343, conductors 435, 432 and 430, the left hand contact of release relay 431 to ground. The connections effected by the brush 344 tend to advance the distributor switch brushes to the second terminals on their associated banks 351, and the connections effected through the brush 343 tend to operate the relays 439 and 442. However, relay 336 is a slow acting relay so that the circuits completed will cause the relays 439 and 442 to be actuated before the brush 344 leaves the first contact of its associated bank, and the relay 336 is not actuated at this time since the operation of the relay 439 will interrupt the circuit to the relay 336 before relay 336 has time to operate.

Energization of the relay 439 connects ground through its contact 438 to the windings of the electromagnet 292 which actuates the clutch 311 to drive the commutator shaft 308 through one complete revolution. The relay 442, upon being energized, connects ground at 445 through its contacts to the contact disks representing the product of 6 by itself and any other digit. In the particular problem selected for illustration, ground will be connected from 445 through the conductor 451 to conductors 452 and 453 and thence to the contact disks representing the product of 6×1 and 6×4, respectively, through the conductor 454 to conductors 455 and 456 and thence to the contact disks representing the product of 6×2 and 6×5, respectively, and through the conductor 457 to conductors 458 and 459 and thence to the contact disks representing the product of 6×3 and 6×6, respectively. Circuits will also be completed to the contact disks representing the product of 6×7, 6×8, and 6×9, but since the numerals 7, 8 and 9 do not appear in the multiplicand, the tracing of the circuits through those contact disks in this particular problem is not necessary.

While some authorities include the zero or cipher (0) with the digits, it is not so included as the term "significant digit" is used in this application. That is, as herein used in the specification and claims, the expression "significant digit" is limited to any one of the numbers or symbols, 1, 2, 3, 4, 5, 6, 7, 8 or 9. A zero or cipher (0) is not a significant digit. The energization of the relay 439 to effect operation of the multiplying commutator shaft 308 occurs only for significant digits entered and stored in the multiplier factor bank 302. When a cipher or zero occurs in an entered multiplier factor, regardless of the denominational position of the cipher, the multiplying commutator 303 is not actuated and the brush 343 automatically steps to the next higher denominational column contact in the bank 302, thereby avoiding any idle computing cycles.

At predetermined points in the rotation of the commutator shaft 308, the grounded brushes will engage conducting portions on the contact disks to thereby connect ground through the contact disks to their associated conductors leading to the multiplicand bank 301. In the first half revolution of the commutator shaft the contacts representing the units part of the product will engage the brushes and in the second half revolution the contacts representing the tens part will engage the brushes. Thus, the contact disk representing the product of 6×6 in the first half revolution would have a contacting portion at the point on its surface which would leave six of nine possible positions yet to pass the brush, and in the second half revolution would have a contacting portion at the point on its surface which would leave three of the nine possible positions yet to pass the brush.

When the contacting portions of the contact disks engage the grounded brushes they will through the lower left hand brushes, which are always in contact with a conducting portion of the contact disk, connect ground through the multiplicand bank to the windings of a plurality of holding relays 460. The other end of the windings of the relays 460 are connected to grounded battery 461 and the relays will thereupon be energized to attract their armatures connecting ground through a conductor 462 and a brush 463 which engages the control commutator 333, completing a locking circuit which maintains the relays 460 energized until the end of each half revolution of the commutator shaft. The control commutator 333 is so constructed that the brush 463 will be connected to ground therethrough at all times except at the end of each half revolution of the commutator shaft when the ground connection therethrough will be broken.

There is provided a relay 460 for each denominational column in the multiplicand bank 301 and upon energization of the relays 460 they will supply ground through their contacts and the multiplicand bank 301, conductors 464 to 469 inclusive, to the brushes 337 to 342 inclusive, respectively. These brushes 337 to 342 now being in engagement with the first contact on their associated banks will connect ground through the brushes, conductors 476, 477, 478, 479, 480, and 481, to one side of the windings of electromagnets 386, representing the units U, tens T, hundreds H, ten hundreds TH, ten thousands TT, and hundred thousands HT, denominational contact disks on the accumulator respectively. The other side of the windings of the electromagnets 386 are connected to battery and ground at 482 and upon ground being supplied thereto primarily through the contact disks of the multiplying commutator and thereafter being connected thereto through the holding relays 460 which derive ground through the control commutator 333, the electromagnets 386 will remain operated until the control commutator breaks contact to ground at the end of each half revolution of the commutator shaft.

Referring back to the particular problem selected for illustration, during the first half revolution of the commutator shaft, the contact disks on the commutator shaft 308 associated with the digit 6 of the multiplier and the digits 6, 5, 4, 3, 2, and 1 of the multiplicand will complete circuits from ground at 445 through the contacts of the relay 442 associated with the digit 6 in the multiplier at the position of the disks which will transmit the digits 6, 0, 4, 8, 2, 6, representing the units part of the product, through the units U, tens T, hundreds H, ten hundreds TH, ten thousands TT, and hundred thousands HT, brushes 337 to 342 in the distributor respectively which, being connected through the conductors 476 to 481 inclusive to the units U, tens T, hundreds H, ten hundreds TH, and hundred thousands HT, electromagnets 386, will effect the rotation of the disks 352 to 357, an amount proportional to the length of time which the electromagnets 386 associated with the units U to hundred thousands HT accumulator disks are energized. Thus it will be apparent that the position of the accumulator disks 352 to 357 respectively will indicate the digit value 6, 0, 4, 8, 2, 6, respectively, as the control commutator 333 breaks the contact to ground, thereby releasing all of the electromagnets 386 and their associated holding relays 460.

As the control commutator 333 breaks contact with the brush 463, a brush 483 associated therewith makes contact with a conducting portion thereof to supply ground to the winding of the distributor switch magnet 336 which will thereupon be actuated to advance the brushes 337 to 344 inclusive into engagement with the second contact on their associated banks of contacts. The brushes 343 and 344 are of what is known as the bridging type; that is, they do not completely disengage from one contact before engaging the next succeeding contact, and as a result of this construction, the relays 439 and 442 do not release since the brushes 343 and 344 make contact with the second contact in their associated banks before releasing contact with the first contact in the associated banks. The commutator shaft 308 will continue to rotate and at this point in a cycle of rotation the cam 409 (Fig. 10) will cause the arms 414 to engage the arms 408 to effect a resetting of the latch 403 and to advance the contact disks 353 to 363 one unit provided the contact disks 352 to 362; that is, the contact disk representing the next lower denominational register, has passed from indicating the digit 9 to indicating the digit 0. The effect of the above described cam action is to add one to those contact disks to which a carry of one in the process of multiplication should be effected. It will be seen that no disk can have passed over nine in the primary operation just described.

As soon as the carry motion has been effected, the second half revolution of the commutator shaft 308 takes place and the contact disks mounted thereon connect ground through the holding relays and the brushes 337 to 343 of the distributor switches which have been moved into association with the second contact on their associated banks of contacts, through the conductors 477, 478, 479, 480, 481, and 485 to the electromagnet 386 associated with the registers representing tens, hundreds, ten hundreds, ten thousands, hundred thousands, and millions in the accumulator. Since the first two contacts on the bank of contacts associated with the brushes 343 are interconnected, the tens part of the product of multiplying the number 1234.56 by 6 thereof will be sent to the accumulator contact disks 353 to 358. The tens part of the product of 6×1234.56 is 011233 and the ground connection will be maintained to the electromagnets 386 a length of time sufficient to rotate their associated contact disks to the point where they will add 3 to the tens, 3 to the hundreds, 2 to the ten hundreds, 1 to the ten thousands, 1 to the hundred thousands, and 0 to the millions contact disks 353 to 358 respectively, whereupon the ground connection through the control commutator 333 will again be broken and the distributor switch magnet 336 energized to step the brushes 337 to 344 into engagement with the third contact on their associated banks of contacts, and the camming action incident to carrying one into denominational registers of the accumulator will be effected where necessary. As the brush 343 leaves the second contact on its associated bank 351, the ground connection to the relay 442 associated with the digit 6 in the multiplier will be broken, de-energizing the relay.

It will be apparent from the foregoing that at the end of the first half revolution of the commutator shaft 308 the contact disks in the accumulator which represent the units U, tens T, hundreds H, ten hundreds TH, ten thousands TT, and hundred thousands HT part of the product will show a partial product of 628406. Since none of these contact disks has passed from 9 to 0, no carry is required and therefore the carry interval is no import. The second half revolution of the commutator shaft transmits the tens part of the product to the contact disks in the accumulator associated with the tens to the millions denominations, and as mentioned hereinbefore, transmits 3, 3, 2, 1, 1, 0, to the contact disks tens to millions respectively.

It will be noted that the contact disk representing the ten hundreds denomination, at the end of the first half revolution of the commutator shaft, is standing on 8, and that in the second half revolution a digit of the value of two is transmitted thereto. This condition requires that a carry be made, and as the disk representing the ten hundreds passes from registering 9 to the position where it registers 0, the latch 403 (Figs. 10, 11, 12 and 13), will be released and at the end of the second half revolution of the shaft a digit of the value of 1 will be sent into the contact disk representing the ten thousands denomination. Simultaneously with the addition of one to the contact disk representing the ten thousands denomination, the brushes 337 to 344 are advanced into engagement with the third contact on their associated banks, as previously described, and the brush 463 breaks contact releasing the holding relays 460 and the product registered on the accumulator contact disks will be 0740736.

The brushes 337 to 344 having been advanced into engagement with the third contacts on their associated banks, the following circuits will be completed: Brush 343, which is grounded through the contact of the starting relay 427 and the contact 433 of the relay 434, will connect ground through the tens column of the multiplier bank 302 through the closed contact 5 to the relay 442 associated with the digit 5, through the relay 439 to grounded battery thereby to energize the relay 442 associated with the digit 5 of the multiplier and complete circuits similar to those completed by the relay 442 associated with the digit 6 in the units column of the multiplier bank. As the brush 343 moved out of engagement with the second contact on its associated bank, the ground connection to the relay 442 associated with the digit 6, in the multiplier bank was broken and the relay de-energized, but the relay 439 was maintained operated due to the bridging action of brush 343 and the commutator shaft 308 continues to rotate since the relay 434 was not released. The process of transmitting electrical connections to the electromagnets 386 of the accumulator continues in the same manner as it did for transmitting the product of 123456 by 6, the step by step movement of the brushes transmitting the actuating currents to the electromagnets 386 precisely as described in connection with the multiplied digit 6, except that the brushes 337 to 342 transmit the actuating current to different register dials in the manner described hereinbefore except where a multiple carry is to be effected.

In the problem selected for illustration, a multiple carry is effected in multiplying the multiplicand 123456 by the multiplier digit 4 since the contact disks units to millions have stored therein 6, 3, 5, 3, 1, 9, 6, and upon the multiplying commutator sending the units part of the product of 4×123456 to the contact disks hundreds, ten hundreds, ten thousands, millions and ten millions, the hundred thousands and millions contact disks will each pass from the position where they indicate 9 to the position where they indicate 1 and 4, respectively, and in so doing will each separately actuate the carry mechanism so that a digit of the value of 1 will be entered in the next higher denominational registers. Specifically, the accumulator contact disks 352, 353, 354, 355, 356, 357 and 358 will have registered therein 6, 3, 5, 3, 1, 9, and 6, respectively, and the accumulator contact disks 354, 355, 356, 357, 358 and 359 will have the digits 4, 0, 6, 2, 8 and 4, respectively, sent thereto. The accumulator contact disks 357 and 358 will pass through the positions where they indicate 9, and in so doing will trip the latch mechanisms and prepare the disks 358 and 359 to receive the digit 1 when the carry operation takes place as explained in detail hereinbefore, for a single carry.

In order to further explain the operation of the carry mechanism, let it be assumed that the units, tens, hundreds, ten hundreds and ten thousands accumulator contact disks are in the position where they indicate that the digit 9 is stored therein in each denomination, and that the mechanism is so operated that the digit 1 is transmitted to the units accumulator contact disk. When the numbers 99999 are stored in these registers, the high tooth of the ratchet 390 will be adjacent the pawl 394 in each of the registers affected and further when the digit 1 is added to the lowest register, its associated dial will advance on tooth, causing the high tooth to lift the pawl 394 which will in turn raise the latch 403 associated with the next higher or tens register, thereby to permit the pawl 394 of the tens register to be moved in a clockwise direction (Fig. 11) by the contractile spring 404. The pawl 394 in the tens register, in moving in a clockwise direction (Fig. 11), will pass over the high tooth of the ratchet in the tens register, and in so doing will release the latch 403 of the hundreds register and the spring 404 of the hundreds register will move the disk 395 of the hundreds register in a clockwise direction, and in so doing the pawl 394 of the hundreds register will pass over the high tooth of the ratchet 390, releasing the latch 403 of the ten hundreds register which will in turn permit the spring 404 of the ten hundreds register to move the disk 395 of the ten hundreds register in a clockwise direction, and the pawl 394 of the ten hundreds register will be drawn over the high tooth of the ratchet 390 of the ten hundreds register to release the latch 403 of the ten thousands register which will permit the spring 404 of the ten thousands register to move the disk 395 of the ten thousands register and it in turn will release the latch and move the pawl of the hundred thousands register so that when the shaft 413 is rocked in a clockwise direction, the pawls 394 of the tens, hundreds, ten hundreds, ten thousands and hundred thousands registers will move their associated ratchet wheels a distance sufficient to add 1 to each of the contact disks 352 to 357, inclusive, so that after the carry cycle takes place the contact disks 352, 353, 354, 355, 356, and 357 will have 00000 and 1, respectively, stored therein. It will be noted at this time that the time allowed for the operation of the latches and pawls of the carry mechanism is sufficient to permit any possible number of multiple carries to be effected within the limits of the machine.

All of the parts function as described hereinbefore until all of the brushes 337 to 343 stand on the thirteenth contacts of their associated banks, at which time the product 15241383936 of 123456×123456, will be registered on the accumulator contact disks 362, 361, 360, 359, 358, 357, 356, 355, 354, 353, and 352, respectively. When the brushes 337 to 344 inclusive engage the thirteenth contact in their associated banks of contacts, the brushes 337 to 343 will be resting on contacts not connected in circuit to any part of the apparatus, and therefore the connection through the brush 343 and one of the relays 442 to the relay 439 will be broken, removing ground from the relay 439 resulting in its deenergization. The de-energization of the relay 439 breaks the circuit which energizes the electromagnet 292, thereby stopping the rotation of the multiplying commutator shaft 308. The brush 344 in engaging the thirteenth contact on its associated bank connects ground through the armature 438 of the relay 439, conductor 440, the brush 344, a conductor 487 to the windings of the release relay 431, the other end of which is connected through a contact disk 488 mounted upon the cam shaft 48 (Figs. 3, 6 and 15), to grounded battery at 426. The completion of this circuit will actuate the release relay 431, causing it to attract its armatures thereby to connect ground through a conductor 489 (Figs. 14 and 15), connected to the conductor 484 through the windings of the electromagnet 336, energizing it. Ground will be connected through the right hand contact of the release relay 431, a conductor 490 to the conductor 419, thence through the winding of the electromagnet 40, a conductor 420 to grounded battery at 426, energizing the magnet 40 and thereby causing the cam shaft 48 to be rotated through one complete revolution. As the shaft 48 moves out of its normal postion, the connection of relay 431 to battery is broken at contact disk 488, releasing the relay, removing ground from and releasing electromagnet 336 and thus advancing the brushes 337 to 344 to their fourteenth terminal.

The cam shaft 48, in rotating through one revolution, will cause a second card to be selected from the magazine 76 and advance onto the movable base plate 153, whereupon the operation as described hereinbefore will be repeated. The energization of the release relay 431 will also disconnect the ground connection to the conductor 430 thereby releasing the locked starting relay 427. The brush 344, upon engaging contact 14 on its associated bank, will complete a circuit from ground through the contact 438 of the relay 439, through the brush 344 and interconnected contacts 1 to 12 and 14 to 22 of its associated bank through the conductor 441, contact of the relay 336, a conductor 491 to the winding of the electromagnet 336 thereby causing it to be actuated eight times in rapid succession to return the brushes 337 to 344 back to their normal position. The operation of the circuit just described will reset the distributor switch 304 for the reception of a second problem.

At this point the accumulator contact disks units to ten billions will have registered therein the product of 1234.56×1234.56 or

TB  B  HM  TM  M  HT  TT  TH  H  T  U
1,  5,  2,   4,  1,  3,  8,  3,  9, 3,  6, and the apparatus is ready to perform its last function, the perforating of the product in the same record card which had previously been positioned beneath the sensing heads. As the electromagnet 40 was energized as described at the end of the multiplying cycle, the card which had been resting upon the movable base plate 153 will be advanced by the card feed rollers into engagement with the card stop 202 (Figs. 5, 7 and 8), in the perforating mechanism 6, whereupon the upper rollers 178 and 179 will be disengaged from the card as described hereinbefore in connection with the card feeding mechanism 3.

Simultaneously with the advancement of the card into engagement with the card stop 202, the cam 65 mounted upon the cam shaft 48 will actuate a cam roller 501 associated therewith (Figs. 3 and 5). The cam roller 501 is mounted upon an end of a bell crank lever 502 pivoted upon the crank supporting shaft 217 and upon actuation by the cam 65, the bell crank lever 502 will be rotated about the shaft 217 in a counterclockwise direction to cause the vertical arm thereof to move upwardly. Attached to the end of the vertical arm of the bell crank lever 502 is a rack 503 which meshes with a gear 504 mounted upon a shaft 505 journalled in side plates 506 and 507 positioned upon the base 2, which side plates form the supporting framework for the perforating mechanism 6. Secured to the shaft 505 is a segmental gear 508 which will be rotated in a clockwise direction upon movement of the vertical arm of the bell crank lever 502 upwardly and in a counterclockwise direction upon movement of the rack 503 downwardly. The vertical arm of the bell crank lever 502 is moved upwardly by the positive camming action between the cam 65 and its associated cam roller 501 mounted upon the bell crank lever 502, the movement of the bell crank lever 502 downwardly is effected by the contractile spring 509 secured to the vertical arm of the bell crank lever and to the base 2.

The segmental gear 508 is adapted to be engaged at intervals during its rotation in a clockwise direction by selected ones of toothed selector bars 510 which it will advance a predetermined amount, dependent upon the point in the clockwise rotation of the segmental gear 508 at which the bar or bars 510 are moved into engagement with the segmental gear. The selector bars 510 have an enlarged portion 511 formed at the left end thereof (Fig. 5), which normally rests upon an upwardly extending portion 512 of a guide plate 513 and have formed on their under surface intermediate their ends a depending angularly deposed projection 514. A supporting bar 515 extends between the side plates 506 and 507 substantially in vertical alignment with the center line of the shaft 505 and is adapted normally to support the right end (Fig. 5) of the selector bars 510 which have a depression 521 formed therein which conforms substantially to the shape of, and which engages the supporting bar 515 when the selector bars are in their normal position.

Secured to the supporting bar 515 is a guide plate 522, having a plurality of slots 523 in the left end (Fig. 5) thereof, through which the selector bars 510 pass and having a plurality of slots 524 in the right end thereof in which a plurality of bell crank levers 525 are slidable. The bell crank levers 525 have pins 526 mounted thereon which, upon rotation of the bell crank levers about their pivot rod 527 in a clockwise direction, engages the under surface of its associated selector bar 510 to move it upwardly into engagement with the segmental gear 508. The selector bars 510 are of such width adjacent their right hand end (Fig. 5) that upon being momentarily moved into engagement with the segmental gear 508 and advanced a short distance thereby, the under surface of the bar will rest upon the upper surface of the supporting bar 521 and hold the selector bar in engagement with the segmental gear during its rotation in a clockwise direction, and until the segmental gear has rotated in a counterclockwise direction to bring the angularly disposed depending portion 514 of the bar into engagement with a horizontally disposed portion 528 of the supporting bar 515 at which time a camming action will take place between the portion 528 of the supporting bar 515 and the portion 514 of the selector bar to disengage the selector bar from the segmental gear 508.

Each bell crank lever 525 has fixed to an arm thereof a contractile spring 529, which has its other end attached to a rod 530 which extends between the side plates 506 and 507. These springs 529 tend to rotate the bell crank levers 525 about their pivot rod 527 in a counterclockwise direction, but they are restrained from movement beyond a predetermined point by an armature 531 of an electromagnet 532. The electromagnets 532, of which there are twenty, are mounted in an arcuate staggered relation upon supporting plates 533, arranged fanwise and supported by the side plates 506 and 507. The electromagnets 532 are connected individually to twenty jacks 534 (Figs. 2 and 15) mounted on the miniature switchboard 252 secured to the front of the base 2, and control twenty bell crank levers 525 which are associated with the selector bars 510 of which there are also twenty. Energization of the electromagnets is effected through circuit connections to be described hereinafter in connection with the clearing of the accumulator contact disks to zero.

The selector bars are adapted to be advanced by the segmental gear varying distances to bring the enlarged portion 511 thereof into engagement with perforating pins 541 of which there are provided 9 associated with each of the selector bars 510, making a total of 180 perforating pins. Each row of nine perforating pins is accurately aligned with a row of possible perforations on a record card which has been positioned in the perforating mechanism by the card feed rollers and the card stop 202.

The perforating pins 541 are positioned in apertures 542 in the guide plate 513, being held in position upon the guide plate by pins 543 passed therethrough, which engage the upper surface of the guide plate 513. Positioned below the guide plate 513 are a pair of guide plates 544 and 546, having apertures 547 and 548 formed therein in exact vertical alignment with the apertures 542 in the guide plate 513. The perforating pins 541 extend through and are guided by the apertures in the guide plates 513, 533 and 546, and upon actuation mesh with apertures 549 formed in a die plate 550 mounted upon uprights 551 positioned upon the base 2. The guide plates 544 and 546 are rigidly supported by the supports 551 and the upper guide plate 513 is formed integral with a ram 552 slidably mounted upon rods 553 and 554.

Pivotally secured to the ram 552 are a pair of links 561 and 562, the lower ends of which are secured to arms 563 and 564 of a yoke 565, pivoted on a rod 566, mounted upon the side plates 506 and 507. An extension 567 has pivoted thereto a link 568, the upper end of which is connected to a vertical arm of the bell crank lever 569. The bell crank lever 569 is rotatable about the crank supporting shaft 217, and carries a pair of cam levers 570 (Fig. 4) and 571 on which are mounted cam rollers 572 and 573 which cooperate with the cams 64 and 63 respectively.

The cams 63 and 64 and their associated cam rollers at predetermined points in the rotation of the cam shaft 48 will impart a reciprocatory motion to the ram 552 and any of the selector bars 510 which have been advanced so that their enlarged portions 511 are positioned above any of the perforating pins 541 will, upon actuation of the ram downwardly, drive the perforating pins through the card positioned on the die plate 550.

One side of the windings of the electromagnets 532 which control the operation of the selector bars 510 are connected through a common conductor 574 (Fig. 15), to a brush 575 engaging the contact disk 488 mounted upon the cam shaft 48, and at a point in the cycle of rotation of the cam shaft 48 just prior to the time when a selector bar which is to be moved through the greatest possible distance is moved by its associated electromagnet and just after the time at which the segmental gear 508 (Fig. 5) starts to rotate in a clockwise direction, the brush 575 will be connected through a conducting portion of the disk 488 to grounded battery at 426, thereby conditioning the electromagnets 532 for operation. A conductor 581 is connected to the common conductor 574 and has leading therefrom conductors 582 and 583 which are connected to one side of the windings of relays 584 and 585, respectively. The other end of the windings of the relays 584 and 585 are connected to ground, and at the beginning of the rotation of the segmental gear in a clockwise direction, the relays will be energized to attract their associated armatures to complete circuits from ground at 586, through the lower right hand brushes of the accumulator contact disks 352 to 363, to the brushes 364 to 375 respectively, their associated conductors through the contacts of the relays 584 and 585 to the electromagnets 386 which control the contact disk units U to hundred billionths HB, 352 to 363 respectively. The relays 584 and 585 are maintained energized under control of the contact disk 488 until the segmental gear 508 (Fig. 5) reaches the end of its rotation in a clockwise direction. The contact disks 352 to 363 the construction of which will be explained more in detail hereinafter have conducting portions associated with the brushes 364 to 375 at all points on their surface except where the disks indicate zero. It will thus be apparent that when the relays 584 and 585 are energized, a circuit will be completed through the disks 352 to 363 and their associated magnets 386 to maintain the magnets energized until the disks return to the position where they indicate zero.

In some problems of multiplication it is desirable to disregard some of the digits which indicate decimal fractions of the final product unless the highest digit to be disregarded is 5 or more than 5 when it is desired to add 1 to the lowest denominational digit of the product to be perforated on the record card. In most instances the denominational digits to be disregarded do not amount to more than the last four places in the product and, therefore, the following circuit connections have been provided whereby the highest accumulator contact disk to be disregarded may be rotated to the position where it registers 5 before the multiplying mechanism is rendered effective so that upon 5 or more being sent to that contact disk the disk will pass the position where it registers 9 and will thereby add 1 to the next higher denominational contact disk.

The contact disks 352, 353, 354, and 355 in the accumulator have brushes 601, 602, 603 and 604 associated therewith, which make contact with a conducting portion of the disks at all positions thereof except when they register the digit 5. The brushes 601, 602, 603 and 604 are connected by conductors 605, 606, 607 and 608 to contacts 609, 610, 611 and 612 of jacks 613, 614, 615 and 616, respectively, (Figs. 2 and 15), in the miniature switchboard 252 positioned on the base 2.

The contact disks 352 to 363 are similar in construction to the disks 307 shown in Figs. 16 and 17. For the purpose of explaining fully the construction of these contact disks the disk 352 has been selected for illustration and is shown in Figs. 20 and 21. The contact disk 352 comprises a non-conducting base 650 to the opposite surfaces of which are secured conducting plates 651 and 652 electrically interconnected and held in place on the disk 650 by copper rivets 653. The contact disk assembly 352 is fixedly mounted on the sleeve 389 which is rotatable with respect to the shaft 381. The plate 651 has a contact brush associated therewith which is connected to ground at 586 as shown in Figs. 15 and 20. This brush is always in contact with plate 651. The brush 364 contacts with the plate 651 at all times except when the contact disk is in a position where it indicates that nothing has been stored in the accumulator or when the contact disk 352 is in the zero position, in which position the brush 364 engages the surface of the non-conducting disk 650. The plate 652 has the portion thereof which would engage the brush 587 cut away at all positions of the contact disk except the position which indicates that 9 has been stored on the contact disk and the plate 652 has a conducting portion in engagement with the brush 601 at all positions except the 5 position, at which time the brush 601 will engage the non-conducting disk 650.

Figure 2:
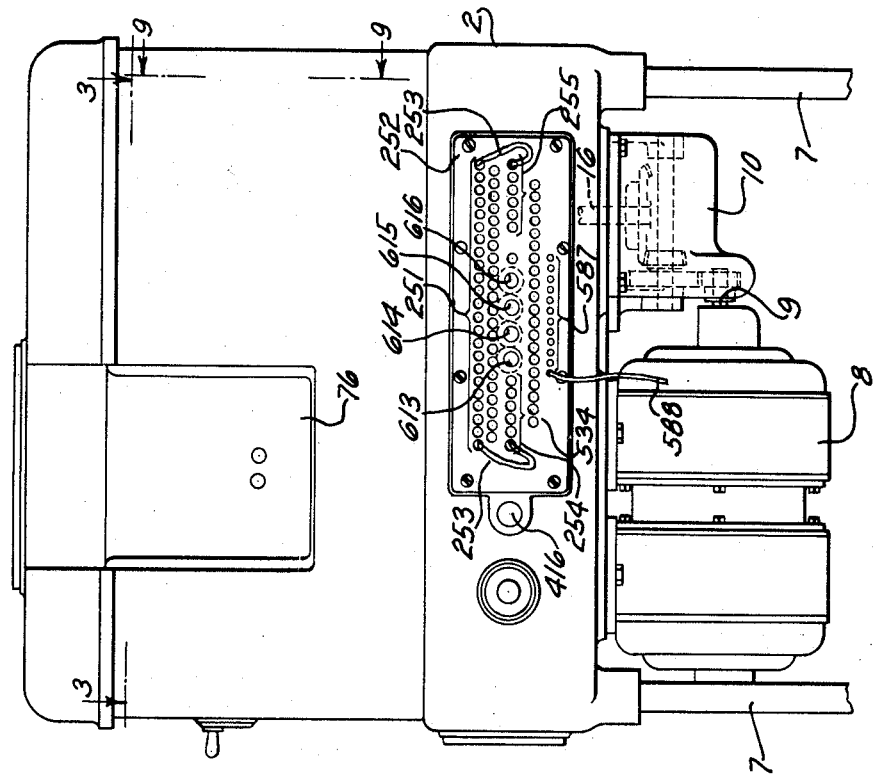

During the return to zero of the accumulator contact disks 352 to 363 the upper left hand brushes associated therewith will connect ground at 586 through the disks, through conductors 587 which terminate in plugs 588 (Figs. 2 and 15). The plugs 588 may be inserted in any twelve of the twenty jacks 534. The contacting portion of the disks 352 to 363 which is associated with the upper left hand brush, will complete the before described circuit only when the contact disks register nine, therefore the electromagnets 532 will be energized as soon as the disks register nine, and will upon energization, attract their armatures 531 (Fig. 5), to move the selector bar 510 associated therewith into engagement with the segmental gear 508. In the particular example which was selected for illustration in connection with the operation of the mutiplying mechanism, the result registered on the accumulator disks 352 to 362 was 6, 3, 9, 3, 8, 3, 1, 4, 2, 5, 1, respectively. Therefore, the contact disk 352 would have to rotate three units to return to nine, whereupon its associated electromagnet 532 would be energized and would advance the bar during the remainder of the clockwise rotation of the segmental gear. In like manner, the contact disks 353, 354, 355, 356, 357, 358, 359, 360, 361 and 362, would rotate through 6, 0, 6, 1, 6, 8, 5, 7, 4, and 8 positions, respectively, before their associated magnets 532 would be energized. Therefore, since the rotation of the cam shaft 48 (Figs. 3 and 4), and the shaft 381 (Figs. 10, 11 and 12), is in synchronism, the selector bars 510 will be advanced into association with the perforating pins 541 which are positioned above the areas in the record card allocated to 6, 3, 9, 3, 8, 3, 1, 4, 2, 5, 1, in the units to ten billions denominational column of the card reserved for the product.

The relay 434 has two sets of windings, one end of one of which is connected to ground at 617, and the other end of which is connected through a conductor 618 to a brush 619 associated with the contact disk 488 and adapted at the end of the forward stroke of the segmental gear 508 (Fig. 5), momentarily to complete a circuit through the contact disks to grounded battery at 426, thereby energizing the relay 434. Upon energization, the relay 434 will complete a circuit from grounded battery at 619' through one of its windings, and an armature 620 to a contact 621 connected by a conductor 622 to contacts 623 in each of the jacks 613 to 616, inclusive.

The energization of the relay 434 will also complete circuits through its armatures from contacts 624, 625, 626, and 627 through conductors 628, 629, 630, and 631, connected to one side of the windings of the electromagnets 386 associated with the units U, tens T, hundreds H, and ten hundreds TH contact disks of the accumulator. A fourth contact 632 is provided in each of the jacks 613, 614, 615 and 616, which is interconnected with the contacts 609, 625, 626 and 627, respectively. A short circuited plug (not shown) may be inserted in any one of the jacks 613 to 616 and will thereby complete circuits to rotate the associated contact disks 352, 353, 354 or 355 to the position where they register 5, each time the brush 619 engages a conducting portion on the contact disk 488, and since the brush 619 makes contact with the conducting portion of the contact disk 488 each time the segmental gear completes its rotation in a clockwise direction, it will be apparent that upon addition of 5 or more by the multiplying mechanism to any of the contacts disks which register 5 due to the circuit connections just described, they will be rotated past the 9 position thereof and will, consequently, move the disk in the next higher denominational accumulator a distance sufficient to add 1 thereto as described hereinbefore. The operation described in the preceding paragraph will be effected due to the completion of the following circuits: Assuming that it is desired to omit the perforation in the record sheet associated with the units contact disk; the short circuited plug may be inserted in the jack 613, whereby it will interconnect the contacts 609 and 624 and the contacts 623 and 632 respectively. When the relay 434 is energized at the end of the forward stroke of the segmental gear, a circuit will be completed from ground at 586 through the contact disk 352, brush 601, conductor 605, contacts 609 and 624, which have been interconnected by the plug, the right hand back contact of the relay 434, conductor 628 to the windings of the units electromagnet 386, the other side of which winding is connected to grounded battery at 482. The units electromagnet 386 will thereby be energized and will rotate its contact disks 352 until the digit 5 is registered thereon, at which time contact between the brush 601 and the disk 352 will be broken, the relay 434 having been maintained energized since upon being momentarily actuated by the contact disk 488 completing its circuit, a locking circuit was completed from grounded battery 619 through the winding of the relay 434, contact 621, conductor 622, contact 623 of the jack 613, contacts 632, the conductor 605, brush 601 and the contact disk 352 to ground at 586. It is to be noted at this point that the operation of the relay 434 breaks the circuit to the starting relay 427 and prevents the multiplying mechanism from operating until the digit 5 is registered in the accumulator contact disk when desired. The insertion of the short circuited plug in the jacks 614, 615, or 616, will complete similar circuits and cause the contact disks 353, 354 or 355 to register 5 just prior to their operation under control of the multiplying mechanism.

Also the flexible cords 253 (Fig. 2) may be so connected in the plug boards 254, 255 and 588 in Figs. 14 and 15 that two problems of multiplication can be accomplished simultaneously, whereby the results may be recorded separately and spaced from each other in a record card. An example of such dual multiplication with the machine disclosed in this application is as follows:

*Denominational columns*

| HB | TB | B | HM | TM | M | HT | TT | TH | H | T | U | |
|----|----|---|----|----|---|----|----|----|---|---|---|---|
|    |    |   |    |    |   |    |    |    |   | 9 | 9 | Multiplicand factor. |
|    |    |   |    |    |   | 4  | 5  |    |   | 9 | 9 | Multiplier factors. |
|    |    |   |    |    |   |    |    |    | 8 | 9 | 1 | Entries made in the accumulator. |
|    |    |   |    |    |   |    |    | 8  | 9 | x |   | Cycles omitted by the reason of the set up of the flexible cords 253 in the plug board. |
|    |    |   |    |    |   |    |    | x  |   |   |   | |
|    |    |   |    | 3  | 4 | 9  | 5  |    |   |   |   | Entries made in the accumulator. |
|    |    |   |    |    | 4 | 4  | 5  | 5  | 9 | 8 | 0 | 1 | Products. |
| 4  | 4  | 5 | 5  |    |   |    |    |    | 9 | 8 | 0 | 1 | Separate products of the two individual computations are transferred to the perforator selector magnets 532 and perforated in the record card in predetermined locations therein as indicated by a proper set up of the plug board 588 (Fig. 15). |

The following brief description of the operation of the apparatus described hereinbefore it is believed, will aid in obtaining a clear understanding of the apparatus.

The cards 77 may be positioned in the magazine 76 and the start key 416 momentarily depressed will cause the clutch members 26 and 27 to be engaged for the purpose of driving the cam shaft 48 through one complete revolution. As the cam shaft 48 rotates through one complete revolution (Figs. 3, 4, 5 and 6), a card will be selected from the bottom of the magazine 76 by the pick-up finger 86 and advanced thereby into engagement with the card feed rollers and into position upon the movable base plate 153, and 5 will be registered on a contact disk associated with any jack in which a short circuited plug has been inserted. Upon continued rotation of the shaft 48 the base plate 153 will be moved upwardly and will cooperate with the sensing heads 225 and 226 (Fig. 3) to complete circuits through the apertures in the card for controlling the operation of the multiplying mechanism 5, which will effect the necessary computation and at the completion of the problem will again cause the clutch members 26 and 27 to be engaged to drive the cam shaft 48 through one complete revolution. The cam shaft 48, in rotating through one complete revolution, will advance the card which had been positioned on the movable base plate 153, into the perforating mechanism 6 where it will be positioned by the card stops 202. Simultaneously with the movement of the card into the perforating apparatus, a second card will be selected from the bottom of the magazine 76 and advanced to the sensing mechanism 4, and the selector bars 510 will be advanced into association with the perforating pins 541 under control of the multiplying mechanism 5, and the ram 522 will be moved downwardly to perforate the answer of the problem in the card positioned in the perforating mechanism 6.

As soon as the result of the multiplication is perforated in the card positioned in the perforating mechanism 6, the sensing mechanism will be rendered effective to transmit the information from the card positioned therein to the multiplying mechanism, and the selector bars will be retracted to their normal position.

At the completion of the second problem of multiplication, the operation described hereinbefore will be duplicated and the card positioned in the perforating mechanism 6 will be directed to the hopper 222, the card positioned in the sensing mechanism will be advanced to the perforating mechanism, and the bottom card in the magazine 76 will be advanced to the sensing mechanism. The sequence of operations will continue until all of the cards in the magazine 76 have been passed through the apparatus whereupon when no card is positioned in the sensing mechanism as the movable base plate 153 is moved upwardly contact between the contact springs 277 and 278 will not be made and the starting relay 427 (Fig. 14) will not be operated, resulting in stopping of the apparatus.

What is claimed is:

1. In an electrical computing system, means for taking factor data from a record sheet, means connected therewith for effecting a multiplication in accordance with the factor data taken from the sheet, means for registering the result of the computation, means for resetting the registering means to zero, means for recording the result of the computation on a record sheet, and means responsive to the operation of the register as it is being reset for controlling the operation of the recording means.

2. In a calculating apparatus, a multiplying commutator, means for rotating the commutator, means for rendering the rotating means effective to rotate the commutator, sensing mechanisms for reading data representations from a record sheet and transmitting them to the commutator, means controlled by the commutator for registering the result of the computation and means for controlling said rendering means by one of said sensing mechanisms.

3. In a computing system, sensing means responsive to information on a record member for entering simultaneously all the factors of a mathematical problem, means controlled by the entering means for effecting a multiplication, an accumulator, and means controlled by the accumulator for indicating the result of the multiplication on a record sheet.

4. In a computing machine, an accumulator, means for actuating the accumulator, a plurality of electrical contact members representing multiplication tables for controlling the actuating means, card controlled set up means for storing simultaneously the factors of a mathematical problem and for controlling the operation of the contact members, and means controlled by the accumulator for indicating the result of a mathematical problem.

5. In a computing recording system, a plurality of circuits representing results of multiplication tables, means for conditioning the circuits for operation, stationary card controlled factor storing means for selectively completing predetermined ones of the conditioned circuits in succession in accordance with the factors of a mathematical problem indicated on the stationary card, and means controlled by the completed circuits for indicating the result of the problem on a record card.

6. A calculating machine having multiplying devices in combination with means for concurrently sensing two multi-denominational factors from a stationary record and entering the same into the multiplying devices, an accumulator controlled by the multiplying devices, and means for operating the multiplying devices to obtain the product of the factors on the accumulator.

7. A calculating machine with multiplying devices and means for controlling the same by a succession of records having identifying marks thereon representative of factors of individual problems, means for automatically effecting by the aforesaid multiplying devices the multiplying operation of one set of coordinated factors entered simultaneously from a record while stationary, means for thereafter automatically and wholly by the operation of the machine itself initiating a succeeding multiplying operation pertaining to another set of factors by the aforesaid multiplying devices, and means for automatically clearing the machine after one multiplying operation to place it in condition to perform a succeeding multiplying operation.

8. A multiplying machine having in combination record responsive means for detecting the number of significant digits in one of the factors of a computation and their denominational values, and means for controlling the computing cycle of the machine in accordance with the detection of such number of digits irrespective of their numerical value.

9. A calculating machine with means for entering therein under record card control a plurality of separate factors each being in multi-denominational form, means for detecting the number of significant digits of one of the factors, and means controlled by said last mentioned means for selectively determining the number of computing cycles of the machine.

10. A calculating machine including in combination multiplying devices, reading in devices for the multiplying devices, reading out devices to read out the result formed by the multiplying devices, and operating means for bringing about a cycle of operation of the reading in devices, the multiplying devices and the reading out devices, and means effective after the completion of the reading in cycle by the reading in devices and before the completion of the reading out cycle by the reading out devices for returning the reading in devices to normal non-reading position.

11. A power operated partial products type of multiplying machine having a cycle controller therefor, factor sensing means, means controlled by the sensing means for causing the machine to cycle and to compute in accordance with each significant figure sensed both as to magnitude and as to denominational place, and to wholly omit machine cycles when zeros are sensed in any denominational orders, said cycle controller also including means for re-initiating a new and separate computation.

12. A record controlled multiplying machine of the partial products type comprising a single accumulator in which both the right hand and left hand components of partial products are entered upon creation of the same, a record sensing mechanism in which a record is retained during the multiplying computation while partial products are being created and accumulated, and means controlled by the record sensing means for controlling the creation and entry of partial product components into the single accumulator to indicate the final result, and means for automatically initiating a new computation.

13. A record controlled multiplying machine comprising electromagnetically controlled accumulating means for receiving partial products, a record sensing mechanism with provisions for partially establishing and maintaining electrical circuits in accordance with multiplier and multiplicand factor data, multiplying means for emitting impulses through certain of the aforesaid circuits to the aforesaid accumulating means to indicate the product, and means for automatically and wholly by the operation of the machine itself initiating a succeeding multiplying operation pertaining to another set of multiplier and multiplicand factor data by the aforesaid multiplying means.

14. A record controlled and record making accounting machine with a record sensing station, and record sensing means at such station, accumulating means, multiplying means for controlling said accumulating means, record feeding devices for feeding a record to the record sensing station, means for thereupon operating the record sensing means and for retaining the record at the sensing station during the entire computation, and means operative while the record is so retained for controlling the multiplying means directly from the record, a punching mechanism, and means effective upon completion of an entire computation for advancing the computed record to said punching mechanism.

15. A record controlled accounting machine with multiplying relays with multi-contacts to selectively control the flow of impulses to accumulating means, a record sensing mechanism with a multiplier sensing section to concurrently sense multiple columns of a record, said sensing mechanism also having a multiplicand sensing section to concurrently sense other multiple columns of the record, and to thereby partially establish multiplier relay selection circuits and multiplicand selection circuits through the sensed record, means for sequentially and column by column establishing the multiplier relay selection circuits, and impulse circuits extending from the multi-contacts of the multiplier relays through the multiplicand selection circuits established through the record to the accumulating means.

16. A record controlled accounting machine comprising a supply magazine, a sensing means at a sensing station, means for withdrawing a card from the magazine and presenting the same to the sensing station and thereupon suspending further feeding movement of the card while the same is being sensed, multiplying mechanism means called into action upon the sensing of the card for initiating multiplying operations by said multiplying mechanism under the control of the sensing mechanism and the cooperating card for effecting computations by one factor column by column and by another factor by concurrent multiple column operations, and means effective upon completion of the computing operations for discharging the card from the sensing station and for subsequently re-initiating the introduction of a new card therewith from the supply magazine by the first mentioned card handling means.

17. A computing machine with card controlled means for separately concurrently sensing the two factors which are to enter into a multiplying computation, each sensing means being adjustable and effective for selective sensing of the card, means under the conjoint control of the said separate sensing means and effective according to the selective conjoint sensing action therebetween for converting the two separately and concurrently sensed factors into differentially timed impulses representative of units and tens partial products, and means for accumulating and combining these partial products to indicate the final result.

18. A computing machine with sensing devices for concurrently sensing two factors of a to be performed multiplying computation from a record, each sensing device being itself effective for selective sensing of the record and said sensing devices by their individual selective sensing action and by their conjoint cooperative sensing action selecting circuits and the differential time of impulse flow in said circuits to provide an impulse representation of a product or representative of units and tens partial products, means for accumulating and combining these partial products to indicate the final result, and means for automatically initiating another sensing operation by the card controlled means to effect a new computation.

19. In a calculating machine having an emitter which has the potential capability of emitting impulses one for each digit, which impulses are differentially timed so that by their timing they are representative of the digits of a notation, a plurality of digit lines leading from the emitter, one for each digit of the notation, an accumulating type of receiving device adapted to receive and be controlled by impulses from said emitter, lines leading to said receiving device, selector means for control of impulse flow over said last mentioned set of lines and for selection of digits and denominational allocation of impulses which flow to the receiving device, electromagnetically controlled coordinating switching means for coordinating the emitted impulse in accordance with a predetermined progression, said electromagnetic coordinating means comprising a plurality of relay devices, one of which is provided for each digit of the notation involved in one of the factors of a computation, and electromagnetically controlled switching means intermediate the selecting means and the lines leading to the receiving device for controlling the flow of impulses into the selected columnar order of the receiving devices.

20. An accounting machine including a receiving device which is controlled by differentially timed impulses, a series of digit lines for each digit of a notation, an impulse emitter adapted in each cycle of operation to be capable of emitting to each digit line an impulse which is differentially timed according to the value of the digit, an electromagnetic switching means associated with the lines for coordinating the impressed impulses on their way to the receiving device according to a progression, said electromagnetic switching means including a plurality of electromagnetically controlled switching devices, one for each digit or significant number of the notation involved in the computation.

21. In a computing machine, means for sensing a record card and for setting up electrical contacts of all the factors of a to be performed computation sensed from the card, an accumulator, an electromagnetically controlled denominational distributor, a plurality of sets of electrical contacting means comprising computing tables for the digits, impulse circuits controlled by the setting up contacts of the sensing means for all of the factors and by the distributor and by the computing table contacting means to send impulses to the accumulator to obtain the result of the computing of the sensed factors, a cycle controller for initiating computing cycles to establish the aforesaid impulse circuits, and means controlled by the cycle controller for omitting a computing cycle when a zero occurs in one of the factors.

22. A cyclically operable calculating machine comprising, analyzing devices, an accumulator, means for feeding a card to and from said analyzing devices at a predetermined speed, means for stopping the feeding of the card when in analyzing position, means for then effecting a multiplication under control of said analyzing devices and entering one or more digits of the result in said accumulator, a total taking means for taking a total from said accumulator, and means operable to effect an automatic operation of the total taking means and for coincidentally causing the operation of the feeding means at said predetermined speed to feed the card controlling the computation out of analyzing position.

23. In a machine of the class described, an accumulating element, means including a clutch mechanism and an actuating magnet for causing data entries representative of digits to be made in said element, a read-out control device positioned by said element, recording control mechanism, and means controlled by said readout device for initiating operation of said recording control mechanism and said magnet and effecting an overlap in their operation.

24. In an accounting machine, an accumulator including clutch mechanisms and actuating magnets for causing data entries representative of digits to be entered in said accumulator, readout control devices positioned by said accumulator, recording control means, and means cooperating with said devices for energizing the actuating magnets through the readout control devices and for initiating an operation of said recording control means.

25. In a machine of the class described, an accumulating element, means including a clutch mechanism and an actuating magnet for causing data entries representative of digits to be made in said element, a read-out control device positioned by said element, recording control mechanism and means controlled by said device for initiating an operation of said magnet and for initiating an operation of said recording control mechanism while said magnet and said accumulating elements are operated.

26. In a machine of the class described, an accumulating element, means including a clutch mechanism and an actuating mechanism for causing data entries representative of digits to be made in said element, a read-out control device positioned by said element, recording control mechanism, and means controlled by said readout device for effecting operation of said actuating mechanism to move the accumulating element to zero position and for also effecting operation of the recording control mechanism during the movement of the accumulating element before it reaches zero position.

27. In an accounting machine, an accumulating element, means including a member for actuating the accumulating element for causing data entries representative of digits to be made in said element, a readout control device positioned by said element, recording control mechanism, and means controlled by said read-out device for effecting concurrent operations of the recording control mechanism and the actuating member for the accumulating element.

28. A record controlled computing machine with a result receiving device and multiplication effecting means for controlling the same comprising stationary contacts and a cooperating commutator, said commutator having conducting surfaces thereon disposed and related to the cooperating contacts so as to have multiplication table characteristics and which surfaces are representative of the individual digital values of products to be entered into the result receiving device.

29. A record controlled and record making accounting machine with a supply magazine for a plurality of records, a record sensing station and record sensing means at such station, accumulating means, multiplying means for controlling said accumulating means, a record feeding device for feeding a record from a supply magazine directly to the record sensing station, means for thereupon operating the record sensing means and for retaining the record at the sensing station during the entire computation, means operative while the record is so retained for controlling the multiplying means directly from the record, a punching mechanism, means effective upon completion of an entire computation for advancing the record through said punching mechanism to punch the result of the computation thereon, means for ejecting the record from the punching mechanism, and means for reinitiating the operation of the record feeding device to feed the next following record to the sensing station.

30. In an accounting machine, a rotatable element, driving means therefor, electro-magnetic means for starting and stopping the element to enter data thereon, means controlled by the element on reaching a predetermined position after an entry has been made thereon and including a contact on the element for controlling the reading-out of the entry.

31. In a multiplying punch, a multiplier setting-up means, means for selecting the multiplier digits one at a time, a source of electrical energy, multiplying means for establishing circuits and for converting electrical energy into impulses representing the product of the selected multiplier digit by each of the digits one to nine inclusive, a multiplicand setting up means for selecting those of the circuits which carry impulses representing the product of the selected multiplier digit by each of the multiplicand digits, means for moving the multiplier and multiplicand setting means into engagement with a record card to take the factors of a problem therefrom, an electrically controlled accumulator having denominational elements, means for completing the selected circuits through the elements of the accumulator as determined by the denominational orders of the selected multiplier digit and of the multiplicand digits, and means for perforating a tabulating card with holes representing the accumulated product of the multiplier by the multiplicand.

32. A cycle controller for a power operated partial products type of multiplying machine including card sensing means for storing factors to be multiplied and devices for evaluating one of the two stored factors for the number of significant digits in such entered factor stored in the sensing means and according to the denominational places of such digits, said devices including means for controlling the computation in accordance with such evaluation, and means for re-initiating a new and separate computation upon the completion of the first computation.

33. A calculating machine including in combination, record sensing means for concurrently sensing both factors of a to be performed computation from a record, a record handling means for automatically presenting each of a series of records to the sensing means so that each record may be sensed thereby and then passed through and out of the machine, multiplying means controlled by the factor sensing means for multiplying the factors together and for setting up a representation of the product thereof, and means for co-ordinating the operation of the record handling means and the factor sensing means and the multiplying means so that the record may be sensed and its factors entered and thereafter multiplied, followed by an automatic repetition of such operations with a succeeding record.

34. In a calculating machine including in combination, multiplying devices and product receiving means, recording means controlled by said product receiving means to record a product upon a record, said recording means comprising digital recording elements arranged in a plurality of banks greater in number than the number of columns of the product to be recorded, a plurality of selector means less in number than the number of banks of recording elements for selecting recording elements in cooperative banks, and means for adjusting all of said selector means singly relative to the banks of elements whereby the product may be recorded selectively in different fields of a stationary record.

HAROLD G. JOHNSTONE.

---

CERTIFICATE OF CORRECTION.

Patent No. 2,366,193. January 2, 1945.

HAROLD G. JOHNSTONE.

It is hereby certified that error appears in the printed specification of the above numbered patent requiring correction as follows: Page 8, second column, line 40, for "multiplied" read --multiplier--; page 11, second column, line 26, beginning with the words "During the return" strike out all to and including "product." in line 64, and insert the same after "zero.", same page, first column, line 40; page 14, second column, line 2, claim 17, strike out "and"; line 4, same claim, after "result" insert --, and means for automatically initiating another sensing operation by the card controlled means to effect a new computation--; line 14, claim 18, beginning with "or repre-" strike out all to and including "computation" in line 20., and insert instead --of the concurrently read factors, accumulating means controlled by the impulses to indicate the result, and means for recording the result back on the same record--; and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.